US012455515B2

(12) United States Patent
Takeuchi et al.

(10) Patent No.: US 12,455,515 B2
(45) Date of Patent: Oct. 28, 2025

(54) ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Sakae Takeuchi, Kanagawa (JP); Shimpei Takagi, Kanagawa (JP); Yuka Zenitani, Kanagawa (JP); Koji Sasaki, Kanagawa (JP); Yoshifumi Eri, Kanagawa (JP); Mai Mochida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 842 days.

(21) Appl. No.: 17/711,044

(22) Filed: Apr. 1, 2022

(65) Prior Publication Data

US 2023/0108365 A1 Apr. 6, 2023

(30) Foreign Application Priority Data

Sep. 24, 2021 (JP) ................................ 2021-156200

(51) Int. Cl.

*G03G 9/097* (2006.01)
*G03G 9/08* (2006.01)
*G03G 9/087* (2006.01)

(52) U.S. Cl.

CPC ....... *G03G 9/09725* (2013.01); *G03G 9/0819* (2013.01); *G03G 9/08755* (2013.01); *G03G 9/08795* (2013.01); *G03G 9/08797* (2013.01)

(58) Field of Classification Search

CPC ........... G03G 9/09708; G03G 9/09716; G03G 9/09725

See application file for complete search history.

(56) References Cited

U.S. PATENT DOCUMENTS

2017/0227859 A1* 8/2017 Nakajima .......... G03G 9/09716
2020/0348611 A1 11/2020 Yokota et al.

(Continued)

FOREIGN PATENT DOCUMENTS

JP H056032 1/1993
JP H06273972 9/1994

(Continued)

OTHER PUBLICATIONS

Translation of JP-2015001721.*

(Continued)

*Primary Examiner* — Peter L Vajda
(74) *Attorney, Agent, or Firm* — JCIPRNET

(57) ABSTRACT

An electrostatic charge image developing toner has toner particles and silica particles that are added to an exterior of the toner particles, contain a nitrogen element-containing compound, have a ratio C/D of 0.10 or more and 0.75 or less where C represents an integral value of signals observed in a range of chemical shift of −50 ppm or more and −75 ppm or less in a $^{29}$Si solid-state nuclear magnetic resonance (NMR) spectrum obtained by a cross-polarization/magic angle spinning (CP/MAS) method and D represents an integral value of signals observed in a range of chemical shift of −90 ppm or more and −120 ppm or less in the same spectrum, have an extraction amount X of the nitrogen element-containing compound by a mixed solution of ammonia/methanol of 0.1% by mass or more, and satisfy Expression: Y/X<0.3 where X represents an extraction amount of the nitrogen element-containing compound by a mixed solution of ammonia/methanol and Y represents an (Continued)

extraction amount of the nitrogen element-containing compound by water.

15 Claims, 2 Drawing Sheets

(56) References Cited

U.S. PATENT DOCUMENTS

| | | | | |
|---|---|---|---|---|
| 2023/0095411 A1* | 3/2023 | Takagi | G03G 9/09725 430/108.3 |
| 2023/0107000 A1* | 4/2023 | Zenitani | G03G 9/09725 430/108.6 |

FOREIGN PATENT DOCUMENTS

| | | | | |
|---|---|---|---|---|
| JP | H09166884 | | 6/1997 | |
| JP | 2001194825 | | 7/2001 | |
| JP | 2004220005 | | 8/2004 | |
| JP | 3671641 | * | 7/2005 | G03G 9/08 |
| JP | 2011185998 | | 9/2011 | |
| JP | 2015001721 | * | 8/2015 | G03G 9/09725 |
| JP | 2017-039618 | * | 2/2017 | C01B 33/18 |
| JP | 2019073418 | | 5/2019 | |
| WO | WO 2019/077938 | * | 4/2019 | G03G 9/097 |

OTHER PUBLICATIONS

Translation of JP-3671641.*
Translation of JP 2017-039618.*
Translation of WO 2019/077938.*
“Office Action of Japan Counterpart Application”, issued on May 13, 2024, with English translation thereof, pp. 1-6.

* cited by examiner

ELECTROSTATIC CHARGE IMAGE DEVELOPING TONER, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2021-156200 filed Sep. 24, 2021.

BACKGROUND

(i) Technical Field

The present invention relates to an electrostatic charge image developing toner, an electrostatic charge image developer, a toner cartridge, a process cartridge, an image forming apparatus, and an image forming method.

(ii) Related Art

For forming images by an electrophotographic method, a toner is used as an image forming material. For example, a toner is widely used which contains toner particles that contain a binder resin and a colorant and an external additive that is added to the exterior of the toner particles. As the external additive, silica particles are used in many cases.

For example, JP2019-073418A discloses "hydrophobic silica powder in which (1) a degree of hydrophobicity is 50% or more, (2) an extraction amount X of at least one compound selected from the group consisting of a quaternary ammonium ion, a monoazo-based complex, and a mineral ion by a mixed solvent of methanol and an aqueous methanesulfonic acid solution is 0.1% by mass or more, and (3) the X and an extraction amount Y of the above compound by water satisfy Expression (I) $Y/X<0.15$".

Furthermore, JP2017-039618A discloses "silica powder containing a plurality of silica particles composed of a silica structure having "Si—O" bond as a repeating unit and a quaternary ammonium salt introduced into the structure".

In addition, JP2011-185998A discloses "charge control particles to be used as an external additive configured with transport particles and a charge control agent having adhered to the surface of the transport particles, in which the transport particles are composed of hydrophobic spherical fine silica particles which are obtained by hydrophobizing the surface of hydrophilic spherical fine silica particles obtained by a sol-gel method and have an average particle size of 20 to 500 nm".

Furthermore, JP2001-194825A discloses "fine silica particles prepared by treating spherical hydrophobic fine silica particles having an average primary particle size of 0.01 to 5 μm with a compound selected from the group consisting of a quaternary ammonium salt compound, a fluoroalkyl group-containing betaine compound, and silicone oil".

Moreover, JP1997-166884A discloses "particles that are prepared by treating fine silica particles having a degree of hydrophobicity of 80% or more with an amphoteric surfactant and particles that are prepared by treating fine silica particles having a degree of hydrophobicity of 80% or more with a polymer having a quaternary ammonium salt or a quaternary ammonium group".

SUMMARY

Aspects of non-limiting embodiments of the present disclosure relate to an electrostatic charge image developing toner that has toner particles and silica particles which are added to an exterior of the toner particles and contains a nitrogen element-containing compound, the electrostatic charge image developing toner further suppressing fogging that occurs in a case where images are repeatedly formed, compared to a toner that has silica particles which have a ratio C/D of less than 0.10 and more than 0.75 where C represents an integral value of signals observed in a range of chemical shift of −50 ppm or more and −75 ppm or less in a $^{29}Si$ solid-state nuclear magnetic resonance (NMR) spectrum obtained by a cross-polarization/magic angle spinning (CP/MAS) method and D represents an integral value of signals observed in a range of chemical shift of −90 ppm or more and −120 ppm or less in the same spectrum, have an extraction amount X of the nitrogen element-containing compound by a mixed solution of ammonia/methanol of more than 0.1% by mass, and do not satisfy Expression: $Y/X<0.3$ where X represents an extraction amount of the nitrogen element-containing compound by a mixed solution of ammonia/methanol and Y represents an extraction amount of the nitrogen element-containing compound by water.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for addressing the above problems include the following aspect.

According to an aspect of the present disclosure, there is provided an electrostatic charge image developing toner having toner particles and silica particles that are added to an exterior of the toner particles, contain a nitrogen element-containing compound, have a ratio C/D of 0.10 or more and 0.75 or less where C represents an integral value of signals observed in a range of chemical shift of −50 ppm or more and −75 ppm or less in a $^{29}Si$ solid-state nuclear magnetic resonance (NMR) spectrum obtained by a cross-polarization/magic angle spinning (CP/MAS) method and D represents an integral value of signals observed in a range of chemical shift of −90 ppm or more and −120 ppm or less in the same spectrum, have an extraction amount X of the nitrogen element-containing compound by a mixed solution of ammonia/methanol of 0.1% by mass or more, and satisfy Expression: $Y/X<0.3$ where X represents an extraction amount of the nitrogen element-containing compound by a mixed solution of ammonia/methanol and Y represents an extraction amount of the nitrogen element-containing compound by water.

BRIEF DESCRIPTION OF THE DRAWINGS

Exemplary embodiment(s) of the present invention will be described in detail based on the following figures, wherein.

DETAILED DESCRIPTION

Figure 1:
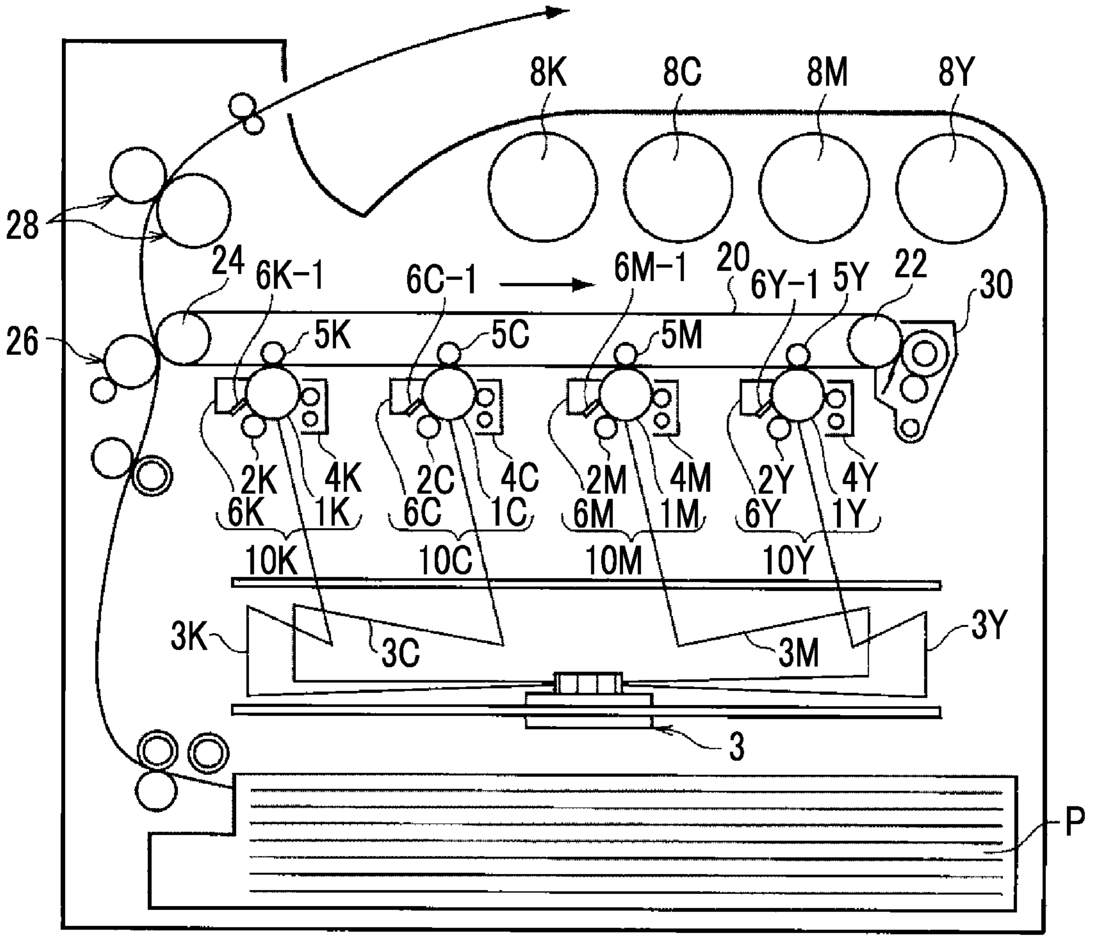
FIG. 1 is a view schematically showing the configuration of an image forming apparatus according to the present exemplary embodiment.

Hereinafter, the present invention will be specifically described with reference to exemplary embodiments as examples.

Regarding the ranges of numerical values described in stages in the present specification, the upper limit or lower limit of a range of numerical values may be replaced with the upper limit or lower limit of another range of numerical values described in stages. Furthermore, in the present disclosure, the upper limit or lower limit of a range of numerical values may be replaced with values described in examples.

In the present specification, each component may include a plurality of corresponding substances.

In a case where the amount of each component in a composition is mentioned in the present specification, and there are two or more kinds of substances corresponding to each component in the composition, unless otherwise specified, the amount of each component means the total amount of two or more kinds of the substances present in the composition.

In the present specification, the characteristics of silica particles are measured by separating the silica particles from a toner. The method for separating the silica particles from the toner is not limited. For example, the silica particles are separated from the toner by the following separation treatment, and the characteristics of the obtained silica particles are measured.

Separation Treatment

In 50 g of a 0.2% by mass aqueous solution of Triton X-100 (manufactured by Sigma-Aldrich Co., LLC.), 2 g of the toner is dispersed. The dispersion is treated with ultrasonic waves for 30 minutes or more under the conditions of 20° C. and 85 WATT by using an ultrasonic homogenizer US-300T (manufactured by NISSEI Corporation) and then subjected to high-speed centrifugation. The supernatant is dried in a vacuum at 80° C., thereby obtaining silica particles.

Electrostatic Charge Image Developing Toner

The electrostatic charge image developing toner (also simply called "toner") according to the present exemplary embodiment has

- toner particles and silica particles added to the exterior of the toner particles (hereinafter, also called "specific silica particles").

The specific silica particles contain a nitrogen element-containing compound and satisfy the following characteristics (1) and (2).

Characteristic (1): In a case where C represents an integral value of signals observed in a range of chemical shift of −50 ppm or more and −75 ppm or less in a $^{29}$Si solid-state nuclear magnetic resonance (NMR) spectrum obtained by a cross-polarization/magic angle spinning (CP/MAS) method (hereinafter, also called "Si-CP/MAS NMR spectrum"), and D represents an integral value of signals observed in a range of chemical shift of −90 ppm or more and −120 ppm or less in the same spectrum, a ratio C/D is 0.10 or more and 0.75 or less.

Characteristic (2): An extraction amount X of the nitrogen element-containing compound by a mixed solution of ammonia/methanol is 0.1% by mass or more, and an Expression: $Y/X<0.3$ is satisfied where X represents an extraction amount of the nitrogen element-containing compound by a mixed solution of ammonia/methanol and Y represents an extraction amount of the nitrogen element-containing compound by water.

Due to the above configuration, the toner according to the present exemplary embodiment may suppress fogging (that is, a phenomenon where the toner adheres to a non-image area) that occurs in a case where images are repeatedly formed. The reason is presumed as follows.

Silica particles have a strong tendency to be negatively charged and are sometimes excessively charged. Therefore, the silica particles have a wide charge distribution. The toner containing silica particles as an external additive having a wide charge distribution causes fogging.

On the other hand, in a case where a nitrogen element-containing compound is adsorbed onto silica particles, it is possible to prevent the silica particles from carrying an excess of negative charge when charged. The nitrogen element-containing compound tends to be positively charged, and the silica particles onto which the nitrogen element-containing compound is adsorbed cancel out the excess of negative charge and are inhibited from carrying the excess of negative charge.

However, because the nitrogen element-containing compound tends to be positively charged, in a case where this compound is adsorbed onto the outermost surface of silica particles, a negative charge distribution and a positive charge distribution widen. Therefore, for example, it is preferable that the nitrogen element-containing compound be in pores and the like rather than covering the surface of the silica particles.

In the toner according to the present exemplary embodiment, as silica particles, specific silica particles are used in which the ratio C/D of C as an integral value of signals observed in a range of chemical shift of −50 ppm or more and −75 ppm or less in a Si-CP/MAS NMR spectrum to D as an integral value of signals observed in a range of chemical shift of −90 ppm or more and −120 ppm or less in the same spectrum falls into the range described above.

Regarding the specific silica particles, showing signals having integral values that fall into the above range means that a low-density structure (for example, a $SiO_{2/3}CH_3$ layer) is formed on the surface of at least some of the silica particles, the structure being configured with a reaction product of a trifunctional silane coupling agent onto which a sufficient amount of nitrogen element-containing compound is adsorbed. The structure configured with a reaction product of a trifunctional silane coupling agent has a low density and is in the form of pores onto which the nitrogen element-containing compound is easily adsorbed.

Furthermore, this structure reduces the amount of OH groups that inhibit the adsorption of the nitrogen element-containing compound and makes the amount of OH groups fall into the above range. Therefore, a sufficient amount of nitrogen element-containing compound is easily adsorbed onto the structure configured with the reaction product of a trifunctional silane coupling agent, and the amount of such a compound adsorbed increases.

In addition, in the toner according to the present exemplary embodiment, as silica particles, the specific silica particles are used which have an extraction amount X of the nitrogen element-containing compound by a mixed solution of ammonia/methanol is 0.1% by mass or more satisfy Expression: $Y/X<0.3$ where X represents an extraction amount of the nitrogen element-containing compound by a mixed solution of ammonia/methanol and Y represents an extraction amount of the nitrogen element-containing compound by water.

That is, in the specific silica particles, as a nitrogen element-containing compound, a nitrogen element-containing compound is used which is poorly soluble in water, that is, unlikely to adsorb moisture in the air.

In the silica particles containing a nitrogen element-containing compound, in a case where the nitrogen element-containing compound adsorbs moisture, the charge distribution widens, and the nitrogen element-containing compound is easily detached from the silica particles.

However, the silica particles containing a nitrogen element-containing compound is difficult to adsorb moisture in the air are unlikely to have a wider charge distribution even though there is a large amount of moisture in the air (even in a high-temperature and high-humidity environment) and unlikely to experience the detachment of the nitrogen element-containing compound, and easily retain a narrow charge distribution.

Accordingly, the charge distribution is further narrowed by the nitrogen element-containing compound.

Presumably, for the aforementioned reasons, the silica particles according to the present exemplary embodiment may suppress fogging that occurs in a case where images are repeatedly formed.

The toner according to the present exemplary embodiment contains, as an external additive, the specific silica particles having a structure in which a sufficient amount of nitrogen element-containing compound is adsorbed onto at least a part of pores of the silica particles. The nitrogen element-containing compound is unlikely to be detached from the specific silica particles even with the passage of time (for example, even in a case where images are repeatedly formed). As a result, the occurrence of fogging, the occurrence of toner scattering (hereinafter, also called “cloud”), and the deterioration of fine line reproducibility may be suppressed even with the passage of time.

Regarding the specific silica particles in the toner according to the present exemplary embodiment, in a case where A represents a pore volume of pores having a diameter of 1 nm or more and 50 nm or less determined from a pore size distribution curve obtained by a nitrogen adsorption method before baking at 350° C., and B represents a pore volume of pores having a diameter of 1 nm or more and 50 nm or less determined from a pore size distribution curve obtained by a nitrogen adsorption method after baking at 350° C., B/A is, for example, preferably 1.2 or more and 5 or less, and B is, for example, preferably 0.2 $cm^3/g$ or more and 3 $cm^3/g$ or less.

Hereinafter, “pore volume A of pores having a diameter of 1 nm or more and 50 nm or less determined from a pore size distribution curve obtained by a nitrogen adsorption method before baking at 350° C.” will be also called “pore volume A before baking at 350° C.”.

On the other hand, “pore volume B of pores having a diameter of 1 nm or more and 50 nm or less determined from a pore size distribution curve obtained by a nitrogen adsorption method after baking at 350° C.” will be also called “pore volume B after baking at 350° C.”.

For the specific silica particles, the pore volume B after baking at 350° C. is a pore volume determined after the volatilization of the nitrogen element-containing compound adsorbed onto the pores of the silica particles by baking and clogging some of the pores. Therefore, for the silica particles, B/A of 1.2 or more and 5 or less and B of 0.2 $cm^3/g$ or more and 3 $cm^3/g$ or less mean that a sufficient amount of nitrogen element-containing compound is adsorbed onto at least some of the pores of the specific silica particles. Accordingly, the charge distribution of the specific silica particles is further narrowed by the nitrogen element-containing compound.

As a result, the fogging that occurs in a case where images are repeatedly formed is more likely to be suppressed. In addition, the occurrence of clouds and the deterioration of fine line reproducibility are more likely to be suppressed.

Hereinafter, the toner according to the present exemplary embodiment will be specifically described.

The toner according to the present exemplary embodiment contains toner particles and an external additive.

Toner Particles

The toner particles contain a binder resin. As necessary, the toner particles may contain a colorant, a release agent, and other additives.

Binder Resin

Examples of the binder resin include vinyl-based resins consisting of a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the binder resin include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these binder resins may be used alone, or two or more of kinds of these binder resins may be used in combination.

As the binder resin, for example, polyester resin is suitable.

Examples of the polyester resin include known polyester resins.

Examples of the polyester resin include a condensed polymer of a polyvalent carboxylic acid and a polyhydric alcohol. As the polyester resin, a commercially available product or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, anhydrides of these, lower alkyl esters (for example, having 1 or more and 5 or less carbon atoms) of these, and the like.

One kind of polyvalent carboxylic acid may be used alone, or two or more kinds of polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among these, for example, aromatic diols and alicyclic diols are preferable as the polyhydric alcohol, and aromatic diols are more preferable.

As the polyhydric alcohol, a polyhydric alcohol having three or more hydroxyl groups and a crosslinked structure or a branched structure may be used in combination with a diol. Examples of the polyhydric alcohol having three or more hydroxyl groups include glycerin, trimethylolpropane, and pentaerythritol.

One kind of polyhydric alcohol may be used alone, or two or more kinds of polyhydric alcohols may be used in combination.

The glass transition temperature (Tg) of the polyester resin is for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K7121-1987, "Testing methods for transition temperatures of plastics".

The weight-average molecular weight (Mw) of the polyester resin is, for example, preferably 5,000 or more and 1,000,000 or less, and more preferably 7,000 or more and 500,000 or less.

The number-average molecular weight (Mn) of the polyester resin is, for example, preferably 2,000 or more and 100,000 or less.

The molecular weight distribution Mw/Mn of the polyester resin is, for example, preferably 1.5 or more and 100 or less, and more preferably 2 or more and 60 or less.

The weight-average molecular weight and the number-average molecular weight are measured by gel permeation chromatography (GPC). By GPC, the molecular weight is measured using GPC·HCL-8120GPC manufactured by Tosoh Corporation as a measurement device, TSKgel·Super HM-M (15 cm) manufactured by Tosoh Corporation as a column, and THF as a solvent. The weight-average molecular weight and the number-average molecular weight are calculated using a molecular weight calibration curve plotted using a monodisperse polystyrene standard sample from the measurement results.

The polyester resin is obtained by a well-known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where a monomers as a raw material are is not dissolved or compatible at the reaction temperature, in order to dissolve the monomers, a solvent having a high boiling point may be added as a solubilizer. In this case, a polycondensation reaction is carried out in a state where the solubilizer is being distilled off. In a case where a monomer with poor compatibility takes part in the copolymerization reaction, the monomer with poor compatibility may be condensed in advance with an acid or an alcohol that is to be polycondensed with the monomer, and then polycondensed with the major component.

The content of the binder resin with respect to the total amount of the toner particles is, for example, preferably 40% by mass or more and 95% by mass or less, more preferably 50% by mass or more and 90% by mass or less, and even more preferably 60% by mass or more and 85% by mass or less.

Colorant

Examples of colorants include various pigments such as carbon black, chrome yellow, Hansa yellow, benzidine yellow, indanthrene yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate, various dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye, and the like.

One kind of colorant may be used alone, or two or more of kinds of colorants may be used in combination.

As the colorant, a colorant having undergone a surface treatment as necessary may be used, or a dispersant may be used in combination with the colorant. Furthermore, a plurality of kinds of colorants may be used in combination.

The content of the colorant with respect to the total amount of the toner particles is, for example, preferably 1% by mass or more and 30% by mass or less, and more preferably 3% by mass or more and 15% by mass or less.

Release Agent

Examples of the release agent include hydrocarbon-based wax; natural wax such as carnauba wax, rice wax, and candelilla wax; synthetic or mineral·petroleum-based wax such as montan wax; ester-based wax such as fatty acid esters and montanic acid esters; and the like. The release agent is not limited to these.

The melting temperature of the release agent is, for example, preferably 50° C. or higher and 110° C. or lower, and more preferably 60° C. or higher and 100° C. or lower.

The melting temperature is determined from a DSC curve obtained by differential scanning calorimetry (DSC) by "peak melting temperature" described in the method for determining the melting temperature in JIS K 7121-1987, "Testing methods for transition temperatures of plastics".

The content of the release agent with respect to the total amount of the toner particles is, for example, preferably 1% by mass or more and 20% by mass or less, and more preferably 5% by mass or more and 15% by mass or less.

Other Additives

Examples of other additives include well-known additives such as a magnetic material, a charge control agent, and inorganic powder. These additives are incorporated into the toner particles as internal additives.

Characteristics of Toner Particles and the Like

The toner particles may be toner particles that have a single-layer structure or toner particles having a so-called core shell structure that is configured with a core portion (core particle) and a coating layer (shell layer) covering the core portion.

The toner particles having a core shell structure may, for example, be configured with a core portion that is configured with a binder resin and other additives used as necessary, such as a colorant and a release agent, and a coating layer that is configured with a binder resin.

The volume-average particle size (D50v) of the toner particles is, for example, preferably 2 μm or more and 10 μm or less, and more preferably 4 μm or more and 8 μm or less.

The various average particle sizes and various particle size distribution indexes of the toner particles are measured using COULTER MULTISIZER II (manufactured by Beckman Coulter Inc.) and using ISOTON-II (manufactured by Beckman Coulter Inc.) as an electrolytic solution.

For measurement, a measurement sample in an amount of 0.5 mg or more and 50 mg or less is added to 2 ml of a 5% aqueous solution of a surfactant (preferably sodium alkylbenzene sulfonate, for example) as a dispersant. The obtained solution is added to an electrolytic solution in a volume of 100 ml or more and 150 ml or less.

The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 50,000.

For the particle size range (channel) divided based on the measured particle size distribution, a cumulative volume distribution and a cumulative number distribution are drawn from small-sized particles. The particle size at which the cumulative proportion of particles is 16% is defined as volume-based particle size D16v and a number-based particle size D16p. The particle size at which the cumulative proportion of particles is 50% is defined as volume-average particle size D50v and a cumulative number-average particle size D50p. The particle size at which the cumulative proportion of particles is 84% is defined as volume-average based size D84v and a number-based particle size D84p.

By using these, a volume-average particle size distribution index (GSDv) is calculated as $(D84v/D16v)^{1/2}$, and a number-average particle size distribution index (GSDp) is calculated as $(D84p/D16p)^{1/2}$.

For example, the average circularity of the toner particles is preferably 0.950 or more and 0.990 or less, and more preferably 0.957 or more and 0.980 or less.

The average circularity of the toner particles is measured by FPIA-3000 manufactured by Sysmex Corporation. This device adopts a method of measuring particles dispersed in water or the like by a flow-type image analysis method. In this device, the sucked particle suspension is guided to a flat sheath flow cell, and a flat sample flow is formed by the sheath liquid. The sample flow is irradiated with strobe light, and in this way, a still image of the particles passing through the cell is captured by a Charge Coupled Device (CCD) camera through an object lens. The captured particle image is subjected to two-dimensional image processing. From the projected area and the perimeter, the circularity is calculated. Regarding the circularity, at least 4,000 or more particles are examined by image analysis, and the average circularity is determined by statistical processing.

$$\text{Circularity} = \text{Perimeter as equivalent circular diameter/Perimeter} = [2\times(A\pi)^{1/2}]/PM \qquad \text{Equation}$$

In the above equation, A represents a projected area, and PM represents a perimeter.

For measurement, an HPF mode (high resolution mode) is used, and a dilution factor is 1.0×. Furthermore, in analyzing the data, for the purpose of removing measurement noise, the range of circularity to be analyzed is set to 0.40 to 1.00.

External Additive

The external additive includes the specific silica particles.

The specific silica particles contain a nitrogen element-containing compound, and have the following NMR spectral characteristics and extraction amount characteristics of the nitrogen element-containing compound.

CP/MAS NMR Spectrum

The ratio C/D of the integral value C of signals observed in a range of chemical shift of −50 ppm or more and −75 ppm or less in a Si-CP/MAS NMR spectrum to the integral value D of signals observed in a range of chemical shift of −90 ppm or more and −120 ppm or less in the same spectrum is 0.10 or more and 0.75 or less. From the viewpoint of narrowing the charge distribution of the silica particles, suppressing cloud, and suppressing the deterioration of fine line reproducibility, the ratio C/D is, for example, preferably 0.12 or more and 0.45 or less, and more preferably 0.15 or more and 0.40 or less.

From the viewpoint of narrowing the charge distribution of the silica particles, suppressing cloud, and suppressing the deterioration of fine line reproducibility, in a case where the integral value of all signals in Si-CP/MAS NMR spectrum is regarded as 100%, the ratio of the integral value C (Signal ratio) of the signals observed in a range of chemical shift of −50 ppm or more and −75 ppm or less is, for example, preferably 5% or more, and more preferably 7% or more. The upper limit of the ratio of the integral value C of the signals is, for example, 60% or less.

The Si-CP/MAS NMR spectrum can be obtained by measuring a sample by nuclear magnetic resonance spectroscopy under the following conditions.

Spectrometer: AVANCE 300 (manufactured by Bruker)
Resonance frequency: 59.6 MHz
Measurement nucleus: $^{29}Si$
Measurement method: CPMAS method (using Bruker's standard ParC sequence cp·av)
Waiting time: 4 sec
Contact time: 8 ms
Number of times of integration: 2,048
Measurement temperature: room temperature (25° C., measured temperature)
Center frequency of observation: −3975.72 Hz
MAS rotation speed: 7.0 mm-6 kHz
Reference substance: hexamethylcyclotrisiloxane Extraction Amount of Nitrogen Element-Containing Compound An extraction amount X of the nitrogen element-containing compound by a mixed solution of ammonia/methanol is, for example, 0.1% by mass or more. The extraction amount X of the nitrogen element-containing compound and an extraction amount Y of the nitrogen element-containing compound by water satisfy Expression: Y/X<0.3.

The extraction amount X of the nitrogen element-containing compound is, for example, preferably 50% by mass or more. Here, the upper limit of the extraction amount X of the nitrogen element-containing compound is, for example, 95% by mass or less, because it is difficult for a solution to permeate the pores due to surface tension and thus a part of the nitrogen element-containing compound remains undissolved.

The ratio "Y/X" of the extraction amount Y of the nitrogen element-containing compound to the extraction amount X of the nitrogen element-containing compound is, for example, preferably less than 0.20, and more preferably 0.15 or less. Here, ideally, the lower limit of the ratio "Y/X" is 0. However, because measurement error in a range of about ±1% occurs for X and Y, the lower limit is, for example, 0.01 or more.

Herein, the extraction amounts X and Y of the nitrogen element-containing compound are measured as follows.

First, the silica particles to be measured are analyzed with a thermogravimetric analyzer (for example, a gas chromatograph mass spectrometer manufactured by Netch Japan Co., Ltd.) at a constant temperature of 400° C., the mass fractions of compounds in which a hydrocarbon having at least one or more carbon atoms forms a covalent bond with a nitrogen atom to the silica particles are added up and adopted as W1.

On the other hand, 1 part by mass of the silica particles to be measured are added to 30 parts by mass of an ammonia/methanol solution (manufactured by Sigma-Aldrich Co., LLC., mass ratio of ammonia/methanol=1/5.2) at a liquid temperature of 25° C. and treated with ultrasonic waves for 30 minutes, and then silica powder and an extract are separated. The separated silica particles are dried in a vacuum dryer at 100° C. for 24 hours. Then, by using a thermogravimetric analyzer, the mass fractions of compounds in which a hydrocarbon having at least one or more carbon atoms forms a covalent bond with a nitrogen atom to the silica particles are measured at a constant temperature of 400° C. and adopted as W2.

Thereafter, the extraction amount X of the nitrogen element-containing compound is calculated by the following equation.

$$X=W1-W2 \quad \text{Equation}$$

Furthermore, 1 part by mass of the silica particles to be measured are added to 30 parts by mass of water having a liquid temperature of 25° C. and treated with ultrasonic waves for 30 minutes, and then the silica particles and an extract are separated. The separated silica particles are dried in a vacuum dryer at 100° C. for 24 hours. Then, by using a thermogravimetric analyzer, the mass fractions of compounds in which a hydrocarbon having at least one or more carbon atoms forms a covalent bond with a nitrogen atom to the silica particles are measured at a constant temperature of 400° C. and adopted as W3.

Thereafter, the extraction amount Y of the nitrogen element-containing compound is calculated by the following equation.

$$Y=W1-W3 \quad \text{Equation}$$

Pore Volume

In the specific silica particles, the ratio B/A of the pore volume B after baking at 350° C. to the pore volume A before baking at 350° C. is 1.2 or more and 5 or less. From the viewpoint of narrowing the charge distribution of the silica particles, suppressing cloud, and suppressing the deterioration of fine line reproducibility, the ratio B/A is, for example, preferably 1.4 or more and 3 or less, and more preferably 1.4 or more and 2.5 or less.

The pore volume B after baking at 350° C. is 0.2 $cm^3/g$ or more and 3 $cm^3/g$ or less. From the viewpoint of narrowing the charge distribution of the silica particles, suppressing cloud, and suppressing the deterioration of fine line reproducibility, the pore volume B after baking at 350° C. is, for example, preferably 0.3 $cm^3/g$ or more and 1.8 $cm^3/g$ or less, and more preferably 0.6 $cm^3/g$ or more and 1.5 $cm^3/g$ or less.

Specifically, the baking at 350° C. is carried out as follows.

In a nitrogen environment, the silica particles to be measured are heated to 350° C. at a heating rate of 10° C./min, and kept at 350° C. for 3 hours. Then, the silica particles are cooled to room temperature (25° C.) at a cooling rate of 10° C./min.

The pore volume is measured as follows.

First, the silica particles to be measured are cooled to the temperature of liquid nitrogen (−196° C.), nitrogen gas is introduced, and the amount of nitrogen gas adsorbed is determined by a constant volume method or a gravimetric method. The pressure of nitrogen gas introduced is slowly increased, and the amount of nitrogen gas adsorbed is plotted for each equilibrium pressure, thereby creating an adsorption isotherm. From this adsorption isotherm, a pore size distribution curve in which the ordinate shows a frequency and the abscissa shows a pore diameter is obtained by the equation of the BJH method.

Then, from the obtained pore size distribution curve, an integrated pore volume distribution in which the ordinate shows a volume and the abscissa shows a pore diameter is obtained. From the obtained integrated pore volume distribution, an integral value of pore volumes of pores having a diameter in a range of 1 nm or more and 50 nm or less is calculated and adopted as "pore volume of pores having a diameter of 1 nm or more and 50 nm or less".

Configuration of Silica Particles

The specific silica particles contain a nitrogen element-containing compound.

Specifically, the specific silica particles have, for example, a structure consisting of silica base particles, a reaction product of a trifunctional silane coupling agent that covers at least a part of the surface of the silica base particles, and a nitrogen element-containing compound that is adsorbed onto at least a part of the reaction product. Forming this structure makes it possible to control the pore volume characteristics and Si-CP/MAS·NMR spectral characteristics described above. In addition, it is possible to control the degree of hydrophobicity and the amount of OH groups which will be described later.

Furthermore, the specific silica particles may have a hydrophobized structure on the surface of the structure described above.

Silica Base Particles

The silica base particles are silica particles to form a structure in which at least a part of the surface of the silica particles is configured with a reaction product of a trifunctional silane coupling agent, and a nitrogen element-containing compound is adsorbed onto at least some of the pores of the reaction product of the trifunctional silane coupling agent.

Examples of the silica base particles include dry silica particles and wet silica particles.

Examples of the dry silica particles include silica by a combustion method (fumed silica) obtained by combustion of a silane compound and silica by a deflagration method obtained by explosive combustion of metallic silicon powder.

Examples of the wet silica particles include wet silica particles obtained by a neutralization reaction between sodium silicate and a mineral acid (silica by a precipitation method synthesized·aggregated under alkaline conditions, silica particles by a gelation method synthesized·aggregated under acidic conditions), colloidal silica particles obtained by alkalifying and polymerizing acidic silicate (silica sol particles), and silica particles by a sol-gel method obtained by the hydrolysis of an organic silane compound (for example, alkoxysilane).

From the viewpoint of narrowing the charge distribution of the silica particles, suppressing cloud, and suppressing the deterioration of fine line reproducibility, for example, silica particles by a sol-gel method are preferable as the silica base particles.

Reaction Product of Trifunctional Silane Coupling Agent

The adsorptive structure configured with the reaction product of a trifunctional silane coupling agent has a low density and a high affinity with a nitrogen element-containing compound. Therefore, this structure makes it easy for the nitrogen element-containing compound to be adsorbed onto the deep portions of pores and increases the amount (that is, content) of the nitrogen element-containing compound adsorbed. The adhesion of the nitrogen element-containing compound, which tends to be positively charged, to the surface of silica which tends to be negatively charged produces an effect of canceling out an excess of negative charge. In addition, because the nitrogen element-containing compound is adsorbed not onto the outermost surface of the silica particles but onto the inside of the low-density structure, the silica particles are prevented from carrying an excess of positive charge and thus having a wider charge distribution. Furthermore, because only an excess of negative charge is canceled out, the charge distribution is further narrowed. As a result, the fogging, cloud, and deterioration of fine line reproducibility are more likely to be suppressed.

Examples of the reaction product of a trifunctional silane coupling agent include a reaction product represented by General Formula (TA) in which $OR^2$ is substituted with a OH group, a reaction product obtained by the polycondensation of compounds represented by General Formula (TA) in which $OR^2$ is substituted with a OH group, and a reaction product obtained by the polycondensation of a compound represented by General Formula (TA) in which $OR^2$ is substituted with a OH group and a SiOH group of silica particles. In addition, the reaction product of a trifunctional silane coupling agent includes these reaction products in which all or some of $OR^2$'s are substituted, and reaction products obtained by the polycondensation of all or some of the aforementioned compounds.

The trifunctional silane coupling agent is a non-nitrogen element-containing compound that does not contain N (nitrogen).

Specifically, examples of the trifunctional silane coupling agent include a trifunctional silane coupling agent represented by General Formula (TA).

$$R^1—Si(OR^2)_3 \qquad \text{General formula (TA)}$$

In General Formula (TA), $R^1$ represents a saturated or unsaturated aliphatic hydrocarbon group having 1 or more and 20 or less carbon atoms or an aromatic hydrocarbon group having 6 or more and 20 or less carbon atoms, and $R^2$ represents a halogen atom or an alkoxy group. The plurality of $R^2$'s may be the same group or different groups.

The aliphatic hydrocarbon group represented by $R^1$ may be linear, branched, or cyclic. The aliphatic hydrocarbon group is, for example, preferably linear or branched. The number of carbon atoms in the aliphatic hydrocarbon group is, for example, preferably 1 or more and 20 or less, more preferably 1 or more and 18 or less, even more preferably 1 or more and 12 or less, and still more preferably 1 or more and 10 or less. The aliphatic hydrocarbon group may be saturated or unsaturated. The aliphatic hydrocarbon group is, for example, preferably a saturated aliphatic hydrocarbon group, and more preferably an alkyl group.

Examples of the saturated aliphatic hydrocarbon group include a linear alkyl group (such as a methyl group, an ethyl group, a propyl group, a butyl group, a pentyl group, a hexyl group, a heptyl group, an octyl group, a nonyl group, a decyl group, a dodecyl group, a hexadecyl group, or an eicosyl group), a branched alkyl group (such as an isopropyl group, an isobutyl group, an isopentyl group, a neopentyl group, a 2-ethylhexyl group, a tertiary butyl group, a tertiary pentyl group, or an isopentadecyl group), a cyclic alkyl group (such as a cyclopropyl group, a cyclopentyl group, a cyclohexyl group, a cycloheptyl group, a cyclooctyl group, a tricyclodecyl group, a norbornyl group, or an adamantyl group), and the like.

Examples of the unsaturated aliphatic hydrocarbon group include an alkenyl group (such as a vinyl group (ethenyl group), a 1-propenyl group, a 2-propenyl group, a 2-butenyl group, a 1-butenyl group, a 1-hexenyl group, a 2-dodecenyl group, or a pentenyl group), an alkynyl group (such as an ethynyl group, a 1-propynyl group, a 2-propynyl group, a 1-butynyl group, a 3-hexynyl group, or a 2-dodecynyl group), and the like.

The number of carbon atoms in the aromatic hydrocarbon group represented by $R^1$ is, for example, preferably 6 or more and 20 or less, more preferably 6 or more and 18 or less, even more preferably 6 or more and 12 or less, and still more preferably 6 or more and 10 or less.

Examples of the aromatic hydrocarbon group include a phenylene group, a biphenylene group, a terphenylene group, a naphthalene group, an anthracene group, and the like.

Examples of the halogen atom represented by $R^2$ include a fluorine atom, a chlorine atom, a bromine atom, an iodine atom, and the like. As the halogen atom, for example, a chlorine atom, a bromine atom, or an iodine atom is preferable.

Examples of the alkoxy group represented by $R^2$ include an alkoxy group having 1 or more and 10 or less carbon atoms (for example, preferably having 1 or more and 8 or less carbon atoms, and more preferably having 1 or more and 4 or less carbon atoms). Examples of the alkoxy group include a methoxy group, an ethoxy group, an isopropoxy group, a t-butoxy group, an n-butoxy group, a n-hexyloxy group, a 2-ethylhexyloxy group, a 3,5,5-trimethylhexyloxy group, and the like. The alkoxy group also includes a substituted alkoxy group. Examples of substituents with which the alkoxy group can be substituted include a halogen atom, a hydroxyl group, an amino group, an alkoxy group, an amide group, a carbonyl group, and the like.

The trifunctional silane coupling agent represented by General Formula (TA) is, for example, preferably a trifunctional silane coupling agent in which $R^1$ represents a saturated aliphatic hydrocarbon group having 1 or more and 20 or less carbon atoms, and $R^2$ represents a halogen atom or an alkoxy group.

Examples of the trifunctional silane coupling agent include vinyltrimethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, and phenyltrichlorosilane (these are compounds in which $R^1$ represents an unsubstituted aliphatic hydrocarbon group or an unsubstituted aromatic hydrocarbon group);

3-glycidoxypropyltrimethoxysilane, γ-methacryloxypropyltrimethoxysilane, γ-mercaptopropyltrimethoxysilane, γ-chloropropyltrimethoxysilane, and γ-glycidyloxypropylmethyldimethoxysilane (these are compounds in which $R^1$ represents a substituted aliphatic hydrocarbon group or a substituted aromatic hydrocarbon group); and the like.

One trifunctional silane coupling agent may be used alone, or two or more trifunctional silane coupling agents may be used in combination.

Among these, from the viewpoint of narrowing the charge distribution of the silica particles, suppressing cloud, and suppressing the deterioration of fine line reproducibility, for example, as the trifunctional silane coupling agent, for example, alkyltrialkoxysilane is preferable, and alkyltrialkoxysilane represented by General Formula (TA) is more preferable in which $R^1$ represents an alkyl group having 1 or more and 20 or less (preferably 1 or more and 15 or less) carbon atoms and $R^2$ represents an alkyl group having 1 or more and 2 or less carbon atoms.

From the viewpoint of narrowing the charge distribution of the silica particles, suppressing cloud, and suppressing the deterioration of fine line reproducibility, the amount of the adhering structure, which is configured with the reaction product of a trifunctional silane coupling agent, with respect to the amount of the silica particles is, for example, preferably 5.5% by mass or more and 30% by mass or less, and more preferably 7% by mass or more and 22% by mass or less.

Nitrogen Element-Containing Compound

The nitrogen element-containing compound is a nitrogen element-containing compound, excluding ammonia and a compound that is in a gaseous state at a temperature of −200° C. or higher and 25° C. or lower.

It is preferable that the nitrogen element-containing compound be adsorbed, for example, onto at least some of the pores of the reaction product of a trifunctional silane coupling agent.

Examples of the nitrogen element-containing compound include at least one compound selected from the group consisting of a quaternary ammonium salt, a primary amine compound, a secondary amine compound, a tertiary amine compound, an amide compound, an imine compound, and a nitrile compound.

Examples of the primary amine compound include phenethylamine, toluidine, catecholamine, and 2,4,6-trimethylaniline.

Examples of the secondary amine compound include dibenzylamine, 2-nitrodiphenylamine, and 4-(2-octylamino) diphenylamine.

Examples of the tertiary amine compound include 1,8-bis(dimethylamino)naphthalene, N,N-dibenzyl-2-aminoethanol, and N-benzyl-N-methylethanolamine.

Examples of the amide compound include N-cyclohexyl-p-toluenesulfonamide, 4-acetamide-1-benzylpiperidine, and N-hydroxy-3-[1-(phenylthio)methyl-1H-1,2,3-triazol yl]benzamide.

Examples of the imine compound include diphenylmethaneimine, 2,3-bis(2,6-diisopropylphenylimino)butane, and N,N'-(ethane-1,2-diylidene)bis(2,4,6-trimethylaniline).

Examples of the nitrile compound include 3-indoleacetonitrile, 4-[(4-chloro-2-pyrimidinyl)amino]benzonitrile, and 4-bromo-2,2-diphenylbutyronitrile.

From the viewpoint of narrowing the charge distribution of the silica particles, suppressing cloud, and suppressing the deterioration of fine line reproducibility, as the nitrogen element-containing compound, for example, a quaternary ammonium salt is preferable among the above compounds.

One quaternary ammonium salt may be used alone, or two or more such compounds may be used in combination.

The quaternary ammonium salt is not particularly limited, and known quaternary ammonium salts can be used.

From the viewpoint of narrowing the charge distribution of the silica particles, suppressing cloud, and suppressing the deterioration of fine line reproducibility, as the quaternary ammonium salt, for example, a compound represented by General Formula (AM) is preferable. One compound represented by General Formula (AM) may be used alone, or two or more such compounds may be used in combination.

General Formula (AM)

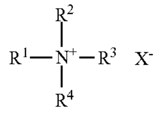

In General Formula (AM), $R^1$, $R^2$, $R^3$, and $R^4$ each independently represent a hydrogen atom or an alkyl, aralkyl, or aryl group which may have a substituent, and $X^-$ represents an anion. Here, at least one of $R^1$, $R^2$, $R^3$, or $R^4$ represents an alkyl, aralkyl, or aryl group which may have a substituent. Furthermore, two or more of $R^1$, $R^2$, $R^3$, and $R^4$ may be linked to form an aliphatic ring, an aromatic ring, or a heterocycle.

Examples of the alkyl group represented by $R^1$ to $R^4$ include a linear alkyl group having 1 or more and 20 or less carbon atoms and a branched alkyl group having 3 or more and 20 or less carbon atoms.

Examples of the linear alkyl group having 1 or more and 20 or less carbon atoms include a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, and the like.

Examples of the branched alkyl group having 3 or more and 20 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, and the like.

Among the above, as the alkyl group represented by $R^1$ to $R^4$, for example, an alkyl group having 1 or more and 15 or less carbon atoms, such as a methyl group, an ethyl group, a butyl group, or a tetradecyl group, is preferable.

Examples of the aralkyl group represented by $R^1$ to $R^4$ include an aralkyl group having 7 or more and 30 or less carbon atoms.

Examples of the aralkyl group having 7 or more and 30 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, a phenyl-cyclopentylmethyl group, and the like.

Among the above, as the aralkyl group represented by $R^1$ to $R^4$, for example, an aralkyl group having 7 or more and 15 or less carbon atoms, such as a benzyl group, a phenylethyl group, a phenylpropyl group, or a 4-phenylbutyl group, is preferable.

Examples of the aryl group represented by $R^1$ to $R^4$ include an aryl group having 6 or more and 20 or less carbon atoms.

Examples of the aryl group having 6 to 20 carbon atoms include a phenyl group, a pyridyl group, a naphthyl group, and the like.

Among the above, as the aryl group represented by $R^1$ to $R^4$, for example, an aryl group having 6 or more and 10 or less carbon atoms, such as a phenyl group, is preferable.

Examples of the anion represented by $X^-$ include an organic anion and an inorganic anion.

Examples of the organic anion include a polyfluoroalkylsulfonate ion, a polyfluoroalkylcarboxylate ion, a tetraphenylborate ion, an aromatic carboxylate ion, an aromatic sulfonate ion (such as a 1-naphthol-4-sulfonate ion), and the like.

Examples of the inorganic anion include molybdate ions (such as $MoO_4^{2-}$, $Mo_2O_7^{2-}$, $Mo_3O_{10}^{2-}$, $Mo_4O_{13}^{2-}$, $Mo_7O_{24}^{2-}$, or $Mo_8O_{26}^{4-}$), $OH^-$, $F^-$, $Fe(CN)_6^{3-}$, $Cl^-$, $Br^-$, $NO_2^-$, $NO_3^-$, $CO_3^{2-}$, $PO_4^{3-}$, $SO_4^{2-}$, and the like.

In General Formula (AM), two or more of $R^1$, $R^2$, $R^3$, and $R^4$ may be linked to each other to form a ring. Examples of the ring formed of two or more of $R^1$, $R^2$, $R^3$, and $R^4$ linked to each other include an alicyclic ring having 2 or more and 20 or less carbon atoms, a heterocyclic amine having 2 or more and 20 or less carbon atoms, and the like.

In the compound represented by General Formula (AM), $R^1$, $R^2$, $R^3$, and $R^4$ may each independently have a substituent. Examples of the substituent include a nitrile group, a carbonyl group, an ether group, an amide group, a siloxane group, a silyl group, an alkoxysilane group, and the like.

It is preferable that $R^1$, $R^2$, $R^3$, and $R^4$ each independently represent, for example, an alkyl group having 1 or more and 16 or less carbon atoms, an aralkyl group having 7 or more and 10 or less carbon atoms, or an aryl group having 6 or more and 20 or less carbon atoms.

Among these, from the viewpoint of narrowing the charge distribution of the silica particles, suppressing cloud, and suppressing the deterioration of fine line reproducibility, the total number of carbon atoms in the compound represented by General Formula (AM) is, for example, preferably 18 or more and 35 or less, and more preferably 20 or more and 32 or less.

Examples of structures other than $X^-$ in the compound represented by General Formula (AM) will be shown below, but the present exemplary embodiment is not limited thereto.

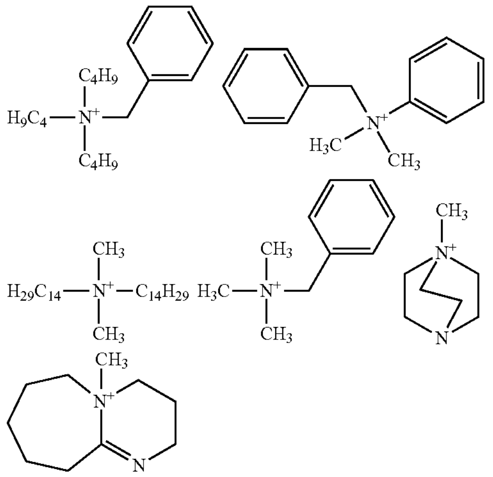

As the nitrogen element-containing compound, from the viewpoint of narrowing the charge distribution of the silica particles, the charge distribution retainability of the silica particles, suppressing fogging, suppressing cloud, and suppressing the deterioration of fine line reproducibility, for example, a nitrogen element-containing compound containing a molybdenum element is preferable, and at least one compound selected from the group consisting of a quaternary ammonium salt containing a molybdenum element (particularly, a salt of quaternary ammonium containing a molybdenum element) and a mixture of a quaternary ammonium salt and a metal oxide containing a molybdenum element is more preferable.

In a case where the nitrogen element-containing compound contains a molybdenum element, the activity of the nitrogen element is enhanced. Therefore, even though the nitrogen element-containing compound is not on the outermost surface of the silica particles but on the inside of pores, the positive chargeability of the nitrogen element can be appropriately exhibited. Therefore, the silica particles have a narrow charge distribution when charged and are likely to exhibit high charge distribution retentivity. As a result, the fogging, cloud, and deterioration of fine line reproducibility are likely to be consistently suppressed.

Especially, in the salt of quaternary ammonium containing a molybdenum element, a strong bond is formed between a molybdenum element-containing anion as a negative ion and a quaternary ammonium cation as a positive ion. Therefore, the charge distribution retentivity is improved. As a result, the fogging, cloud, and deterioration of fine line reproducibility are likely to be consistently suppressed.

Specifically, examples of the quaternary ammonium salt containing molybdenum element include $[N^+(CH)_3(C_{14}C_{29})_2]_4$, $Mo_8O_{28}^{4-}$, $[N^+(C_4H_9)_2(C_6H_6)_2]_2Mo_2O_7^{2-}$, $[N^+(CH_3)_2(CH_2Cl_6H_6)(CH_2)_{17}CH_3]_2MoO_4^{2-}$, $[N^+(CH_3)_2(CH_2Cl_6H_6)(CH_2)_{15}CH_3]_2MoO_4^{2-}$, and the like.

Examples of the metal oxide containing a molybdenum element include a molybdenum oxide (molybdenum trioxide, molybdenum dioxide, or $Mo_9O_{26}$), a molybdic acid alkali metal salt (such as lithium molybdate, sodium molybdate, or potassium molybdate), a molybdenum alkaline earth metal salt (such as magnesium molybdate or calcium molybdate) and other composite oxides (such as $Bi_2O_3 \cdot 2MoO_3$ or $\gamma$-$Ce_2Mo_3O_{13}$).

Detection and Content of Nitrogen Element-Containing Compound

In a case where the specific silica particles are heated at a temperature in a range of 300° C. or higher and 600° C. or lower, a nitrogen element-containing compound is detected. Specifically, for example, the compound is detected as follows.

For detecting the nitrogen element-containing compound, for example, a heating furnace-type drop-type pyrolysis gas chromatograph mass spectrometer using He as a carrier gas is used. The nitrogen element-containing compound can be detected in an inert gas under the condition of a pyrolysis temperature of 300° C. or higher and 600° C. or lower. Specifically, by introducing silica particles in an amount of 0.1 mg or more and 10 mg or less into a pyrolysis gas chromatograph mass spectrometer, it is possible to check whether or not the silica particles contain a nitrogen element-containing compound from the MS spectrum of the detected peak. Examples of components generated by pyrolysis from the silica particles containing a nitrogen element-containing compound include an amine represented by General Formula (N) having one or more and three or less C—N bonds and an aromatic nitrogen compound.

In General Formula (N), $R^{N1}$ to $R^{N3}$ each independently represent a hydrogen atom or an alkyl, aralkyl, or aryl group which may have a substituent. $R^{N1}$ to $R^{N3}$ have the same definition as $R^1$, $R^2$, and $R^3$ in General Formula (AM).

For example, in a case where the nitrogen element-containing compound is a quaternary ammonium salt, some of the side chains thereof are detached by pyrolysis at 600° C., and the compound is detected as a tertiary amine.

General Formula (N)

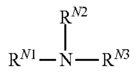

From the viewpoint of narrowing the charge distribution of the silica particles, suppressing cloud, and suppressing the deterioration of fine line reproducibility, the content of the nitrogen element-containing compound with respect to the amount of silica particles is, for example, preferably 0.008% by mass or more and 0.45% by mass or less, more preferably 0.015% by mass or more and 0.20% by mass or less, and even more preferably 0.018% by mass or more and 0.10% by mass or less, in terms of N atoms.

The content of the nitrogen element-containing compound in terms of N atoms is measured as follows.

By using an oxygen·nitrogen analyzer (for example, EMGA-920 manufactured by HORIBA, Ltd.), a sample is measured for a total of 45 seconds, thereby obtaining the abundance of a nitrogen element as a ratio of N (N/Si). As a pretreatment, the sample is dried in a vacuum dryer for 24 hours or more at 100° C. so that impurities such as ammonia are removed from the silica particles.

In a case where the nitrogen element-containing compound containing a molybdenum element is used as a nitrogen element-containing compound, from the viewpoint of narrowing the charge distribution of the silica particles, suppressing cloud, and suppressing the deterioration of fine line reproducibility, a ratio (Mo/Si) of Net intensity of the molybdenum element to Net intensity of a silicon element measured by X-ray fluorescence analysis is, for example, preferably 0.035 or more and 0.35 or less, more preferably 0.07 or more and 0.32 or less, and even more preferably 0.10 or more and 0.30 or less.

From the viewpoint of narrowing the charge distribution of the silica particles, suppressing cloud, and suppressing the deterioration of fine line reproducibility, Net intensity of the molybdenum element is, for example, preferably 5 kcps or more and 75 kcps or less, 7 kcps or more and 50 kcps or less, 8 kcps or more and 55 kcps or less, or 10 kcps or more and 40 kcps or less.

Net intensity of the molybdenum element and the silicon element is measured as follows.

Approximately 0.5 g of silica particles are compressed using a compression molding machine by being pressed under a load of 6 tons for 60 seconds, thereby preparing a disk having a diameter of 50 mm and a thickness of 2 mm. This disk is used as a sample for qualitative quantitative elemental analysis performed under the following conditions by using a scanning X-ray fluorescence spectrometer (XRF-1500, manufactured by Shimadzu Corporation), and Net intensity of each of the molybdenum element and the silicon element is determined (unit: kilo counts per second, kcps).

Tube voltage: 40 kV

Tube current: 90 mA

Measurement area (analysis diameter): diameter of 10 mmφ

Measurement time: 30 minutes anti-cathode: rhodium

Hydrophobized Structure

The hydrophobized structure is a structure that has had a reaction with a hydrophobing agent.

As the hydrophobing agent, for example, an organosilicon compound is used.

Examples of the organosilicon compound include

- an alkoxysilane compound or a halosilane compound having a lower alkyl group, such as methyltrimethoxysilane, dimethyldimethoxysilane, trimethylchlorosilane, or trimethylmethoxysilane; an alkoxysilane compound having a vinyl group, such as vinyltrimethoxysilane or vinyltriethoxysilane;
- an alkoxysilane compound having an epoxy group, such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, or 3-glycidoxypropyltriethoxysilane;
- an alkoxysilane compound having a styryl group, such as p-styryltrimethoxysilane or p-styryltriethoxysilane;
- an alkoxysilane compound having an aminoalkyl group, such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, or N-phenyl-3-aminopropyltrimethoxysilane;
- an alkoxysilane compound having an isocyanate alkyl group, such as 3-isocyanatepropyltrimethoxysilane or 3-isocyanatepropyltriethoxysilane;
- a silazane compounds such as hexamethyldisilazane or tetramethyldisilazane; and the like.

Characteristics of Silica Particles

Degree of Hydrophobicity

From the viewpoint of narrowing the charge distribution of the silica particles, suppressing cloud, and suppressing the deterioration of fine line reproducibility, a degree of hydrophobicity of the specific silica particles is, for example, preferably 10% or more and 60% or less, more preferably 20% or more and 55% or less, and even more preferably 28% or more and 53% or less.

In a case where the degree of hydrophobicity of the silica particles is 10% or less, the silica particles are covered with a small amount of the structure due to the reaction caused by the trifunctional silane coupling agent, and the content of the nitrogen element-containing compound is reduced. As a result, the charge distribution easily widens.

On the other hand, in a case where the degree of hydrophobicity of the silica particles is higher than 60%, the density of the structure increases due to the reaction caused by the trifunctional silane coupling agent, the number of pores decreases, and the content of the nitrogen element-containing compound is reduced. Therefore, the charge distribution easily widens.

The degree of hydrophobicity of the silica particles is measured as follows.

As a sample, 0.2% by mass of silica particles are added to 50 ml of deionized water. While the mixture is being stirred with a magnetic stirrer, methanol is added dropwise thereto from a burette, and the mass fraction of methanol in the mixed solution of methanol/water at a point in time when the entirety of the sample is precipitated is determined and adopted as a degree of hydrophobicity.

Number-Average Particle Size and Number-Based Particle Size Distribution Index

The number-average particle size of the specific silica particles is, for example, preferably 10 nm or more and 200 nm or less, more preferably 10 nm or more and 80 nm or less, and even more preferably 10 nm or more and 60 nm or less.

In a case where the number-average particle size of silica particles is in the above range, the silica particles have a large specific surface area and are likely to be excessively charged. However, the specific silica particles can narrow the charge distribution even though the number-average particle size thereof is in the above range. As a result, even though the number-average particle size of the specific silica particles is in the above range, the fogging, cloud, and deterioration of fine line reproducibility are suppressed.

The number-based particle size distribution index of the specific silica particles is, for example, preferably 1.1 or more and 2.0 or less, and more preferably 1.15 or more and 1.6 or less.

In a case where the number-based particle size distribution index of the silica particles is in the above range, the amount of coarse powder that tends to carry a large amount of charge and the amount of fine powder that tends to carry a small amount of charge are reduced, which makes it easy to narrow the charge distribution. As a result, the fogging, cloud, and deterioration of fine line reproducibility are more likely to be suppressed.

The number-average particle size and the number-based particle size distribution index of the silica particles are measured as follows.

The silica particles are observed with a scanning electron microscope (SEM) at 40,000× magnification, the image of the observed silica particles is analyzed with image processing/analyzing software WinRoof (manufactured by MITANI Corporation), and equivalent circular diameters of at least 200 particles are calculated. Then, for the number of individual particles, a cumulative distribution is drawn from the number of small size particles, and a particle size below which the cumulative percentage of particles smaller than this size reaches 50% is determined as a number-average particle size.

Furthermore, a square root of D84/D16 is defined as "number-based particle size distribution index" (GSD), wherein D84 is a particle size below which the cumulative percentage of particles smaller than this size reaches 84%, and D16 is a particle size below which the cumulative percentage of particles smaller than this size reaches 16%. That is, the number-based particle size distribution index $(GSD)=(D84/D16)^{0.5}$.

Circularity

The average circularity of the specific silica particles is, for example, preferably 0.60 or more and 0.96 or less, more preferably 0.70 or more and 0.92 or less, and even more preferably 0.70 or more and 0.90 or less.

In a case where the average circularity of silica particles is in the above range, the silica particles have a large specific surface area and are likely to be excessively charged. However, the specific silica particles can narrow the charge distribution even though the average circularity thereof is in the above range. As a result, even though the average circularity of the specific silica particles is in the above range, the fogging, cloud, and deterioration of fine line reproducibility are likely to be suppressed.

The circularity of silica particles is measured as follows.

Silica particles are observed with a scanning electron microscope (SEM) at 40,000× magnification, the image of the observed silica particles is analyzed with image processing/analyzing software WinRoof (manufactured by MITANI Corporation), the circularity of at least 200 particles is calculated, and an arithmetic mean thereof is calculated and adopted as the average circularity.

The circularity is calculated by the following equation.

$$\text{Circularity}=\text{Perimeter as equivalent circular diameter}/\text{Perimeter}=[2\times(A\pi)^{1/2}]/PM$$

In the above equation, A represents a projected area, and PM represents a perimeter.

Volume Resistivity

The volume resistivity of the specific silica particles (that is, the volume resistivity before baking at 350° C.) is, for example, preferably $1.0\times10^{7}$ Ωcm or more and $1.0\times10^{11.5}$ Ωcm or less, and more preferably $1.0\times10^{8}$ Ωcm or more and $1.0\times10^{11}$ Ωcm or less.

In a case where the volume resistivity of the specific silica particles is in the above range, the silica particles contain a large amount of nitrogen element-containing compound and are unlikely to be excessively charged, which makes it easy to narrow the charge distribution. As a result, the fogging, cloud, and deterioration of fine line reproducibility are more likely to be suppressed.

In the specific silica particles, in a case where Ra represents a volume resistivity of the silica particles before baking at 350° C., and Rb represents a volume resistivity of the silica particles after baking at 350° C., Ra/Rb is, for example, preferably 0.01 or more and 0.8 or less, and more preferably 0.015 or more and 0.6 or less.

In a case where Ra/Rb is in the above range, the silica particles contain a large amount of nitrogen element-containing compound and are unlikely to be excessively charged, which makes it easy to narrow the charge distribution. As a result, the fogging, cloud, and deterioration of fine line reproducibility are more likely to be suppressed.

Baking at 350° C. is carried out as described above.

On the other hand, the volume resistivity is measured as follows. The volume resistivity is measured in an environment at a temperature of 20° C. and a humidity of 50% RH.

Silica particles to be measured are placed on the surface of a circular jig on which a 20 $cm^2$ electrode plate is disposed, so that a silica particle layer having a thickness of about 1 mm or more and 3 mm or less is formed. The same 20 $cm^2$ electrode plate as described above is placed on the silica particle layer so that the silica particle layer is sandwiched between the electrode plates. In order to eliminate voids between the silica particles, a pressure of 0.4 MPa is applied on the electrode plate placed on the silica particle layer, and then the thickness (cm) of the silica particle layer is measured. Both the electrodes placed on and under the silica particle layer are connected to an impedance analyzer (I manufactured by Solartron Analytical). Resistance is measured at a frequency of $10^{-3}$ Hz or more and $10^6$ Hz or less, thereby obtaining a Nyquist plot. On the assumption that there are three resistance components, bulk resistance, particle interface resistance, and electrode contact resistance, the plot is fitted to an equivalent circuit, and a bulk resistance R is determined.

The volume resistivity of silica particles (Ω·cm) is calculated by the following equation.

$$\rho = R/L \quad \text{Equation}$$

In the equation, ρ represents volume resistivity (Ω·cm) of silica particles, R represents bulk resistance (Ω), and L represents the thickness (cm) of the silica particle layer.

Amount of OH Groups

In the specific silica particles, the amount of OH groups measured by the Sears method is, for example, preferably 0.2 OH groups/$nm^2$ or more and 5.5 OH groups/$nm^2$ or less. From the viewpoint of narrowing the charge distribution of the silica particles, suppressing cloud, and suppressing the deterioration of fine line reproducibility, the amount of OH group is, for example, more preferably 0.2 OH groups/$nm^2$ or more and 4 OH groups/$nm^2$ or less, and even more preferably 0.2 OH groups/$nm^2$ or more and 3 OH groups/$nm^2$ or less.

In a case where the structure configured with the reaction product of a trifunctional silane coupling agent is sufficiently formed on the silica base particles, the amount of OH groups measured by the Sears method can be adjusted and fall into the above range.

In a case where the amount of OH groups that inhibit the adsorption of the nitrogen element-containing compound is reduced and falls into the above range, the nitrogen element-containing compound can easily permeate deep into the pores of the silica particles (for example, the pores of the adsorption layer which will be described later). Furthermore, the hydrophobic interaction with the nitrogen element-containing compound works, and the adhesion of this compound to the silica particles becomes stronger. Therefore, the amount of the nitrogen element-containing compound adsorbed increases. In addition, the nitrogen element-containing compound is less likely to be detached. As a result, due to the nitrogen element-containing compound, the charge distribution is further narrowed, and the retentivity of the narrow charge distribution is further improved. As a result, the fogging, cloud, and deterioration of fine line reproducibility are likely to be consistently suppressed.

Furthermore, in a case where the amount of OH groups is reduced and falls into the above range, the environmental dependence of the charging characteristics is reduced. Therefore, in any environment (particularly, in a low-temperature and low-humidity environment where the silica particles are likely to carry an excess of negative charge), the charge distribution can be easily narrowed by the nitrogen element-containing compound. As a result, the fogging, cloud, and deterioration of fine line reproducibility are more likely to be suppressed.

The amount of OH groups is measured by the Sears method. Specifically, the method is as follows.

Silica particles (1.5 g) are added to a mixed solution of 50 g of pure water and 50 g of ethanol, and the mixture is stirred with an ultrasonic homogenizer for 2 minutes, thereby preparing a dispersion. While the dispersion is being stirred in an environment at 25° C., 1.0 g of a 0.1 mol/L aqueous hydrochloric acid solution is added dropwise thereto, thereby obtaining a test liquid. The obtained test liquid is put in an automatic titration device, potentiometric titration using a 0.01 mol/L aqueous sodium hydroxide solution is performed, and a differential curve of the titration curve is created. In the inflection point where the differential value of the titration curve is 1.8 or more, the titration amount by which the titration amount of the 0.01 mol/L aqueous sodium hydroxide solution is maximized is denoted by E.

The surface silanol group density ρ (number of silanol groups/$nm^2$) of the silica particles is calculated using the following equation.

$$\rho = ((0.01 \times E - 0.1) \times NA/1{,}000)/(M \times S_{BET} \times 10^{18}) \quad \text{Equation}$$

Details of the symbols in the equation are as follows.

E: titration amount by which the titration amount of the 0.01 mol/L aqueous sodium hydroxide solution is maximized in the inflection point where the differential value of the titration curve is 1.8 or more.

NA: Avogadro's number

M: Amount of silica particles (1.5 g)

$S_{BET}$: Specific surface area of silica particles ($m^2$/g)

The specific surface area of the silica particles is measured by the three-point BET nitrogen adsorption method. The relative equilibrium pressure is 0.3.

Manufacturing Method of Specific Silica Particles

An example of the manufacturing method of the specific silica particles has a first step of forming a structure configured with a reaction product of a trifunctional silane coupling agent on at least a part of the surface of silica base particles, and a second step of causing a nitrogen element-containing compound to be adsorbed onto at least some of the pores of the reaction product of a trifunctional silane coupling agent.

The manufacturing method of the specific silica particles may further have a third step of hydrophobizing the silica base particles having a structure which covers at least a part of the surface of the silica base particles and is configured with the reaction product of a trifunctional silane coupling agent, and in which the nitrogen element-containing compound is adsorbed onto at least some of the pores of the reaction product of a trifunctional silane coupling agent, after or during the second step.

Hereinafter, the steps of the manufacturing method of the specific silica particles will be specifically described.

Preparation Step

First, a step of preparing silica base particles will be described.

Examples of the preparation step include (i) step of mixing an alcohol-containing solvent with silica base particles so as to prepare a silica base particle suspension, (ii) step of granulating silica base particles by a sol-gel method so as to obtain a silica base particle suspension, and the like.

Examples of the silica base particles used in (i) include sol-gel silica particles (silica particles obtained by a sol-gel method), aqueous colloidal silica particles, alcoholic silica particles, fumed silica particles obtained by a gas phase method, molten silica particles, and the like.

The alcohol-containing solvent used in (i) may be a solvent composed only of an alcohol or a mixed solvent of an alcohol and other solvents. Examples of the alcohol include lower alcohols such as methanol, ethanol, n-propanol, isopropanol, and butanol. Examples of other solvents include water; ketones such as acetone, methyl ethyl ketone, and methyl isobutyl ketone; cellosolves such as methyl cellosolve, ethyl cellosolve, butyl cellosolve, and cellosolve acetate; ethers such as dioxane and tetrahydrofuran; and the like. In the case of the mixed solvent, for example, the proportion of the alcohol is, for example, preferably 80% by mass or more, and more preferably 85% by mass or more.

A step (1-a) is preferably, for example, a step of granulating silica base particles by a sol-gel method so as to obtain a silica base particle suspension.

More specifically, the step (1-a) is, for example, preferably a sol-gel method including an alkali catalyst solution preparation step of preparing an alkali catalyst solution composed of an alcohol-containing solvent containing an alkali catalyst and a silica base particle generation step of supplying tetraalkoxysilane and an alkali catalyst to the alkali catalyst solution so as to generate silica base particles.

The alkali catalyst solution preparation step is, for example, preferably a step of preparing an alcohol-containing solvent and mixing the solvent with an alkali catalyst so as to obtain an alkali catalyst solution.

The alcohol-containing solvent may be a solvent composed only of an alcohol or a mixed solvent of an alcohol and other solvents. Examples of the alcohol include lower alcohols such as methanol, ethanol, n-propanol, isopropanol, and butanol. Examples of other solvents include water; ketones such as acetone, methyl ethyl ketone, and methyl isobutyl ketone; cellosolves such as methyl cellosolve, ethyl cellosolve, butyl cellosolve, and cellosolve acetate; ethers such as dioxane and tetrahydrofuran; and the like. In the case of the mixed solvent, for example, the proportion of the alcohol is, for example, preferably 80% by mass or more, and more preferably 85% by mass or more.

The alkali catalyst is a catalyst for accelerating the reaction of tetraalkoxysilane (a hydrolysis reaction and a condensation reaction). Examples thereof include basic catalysts such as ammonia, urea, and monoamine. Among these, for example, ammonia is particularly preferable.

The concentration of the alkali catalyst in the alkali catalyst solution is, for example, preferably 0.5 mol/L or more and 1.5 mol/L or less, more preferably 0.6 mol/L or more and 1.2 mol/L or less, and even more preferably 0.65 mol/L or more and 1.1 mol/L or less.

The silica base particle generation step is a step of supplying tetraalkoxysilane and an alkali catalyst to the alkali catalyst solution and reacting the tetraalkoxysilane (a hydrolysis reaction and condensation reaction) in the alkali catalyst solution so as to generate silica base particles.

In the silica base particle generation step, core particles are generated by the reaction of the tetraalkoxysilane at the early stage of supplying tetraalkoxysilane (core particle generation stage), and then silica base particles are generated through the growth of the core particles (core particle growth stage).

Examples of the tetraalkoxysilane include tetramethoxysilane, tetraethoxysilane, tetrapropoxysilane, tetrabutoxysilane, and the like. From the viewpoint of controlling the reaction rate or uniformity of the shape of the silica base particles to be generated, for example, tetramethoxysilane or tetraethoxysilane is preferable.

Examples of the alkali catalyst supplied to the alkali catalyst solution include basic catalysts such as ammonia, urea, monoamine, and a quaternary ammonium salt. Among these, for example, ammonia is particularly preferable. The alkali catalyst supplied together with the tetraalkoxysilane may, for example, be of the same type as or different type from the alkali catalyst contained in the alkali catalyst solution in advance. For example, it is preferable that the alkali catalysts be of the same type.

The method for supplying the tetraalkoxysilane and the alkali catalyst to the alkali catalyst solution may be a continuous supply method or an intermittent supply method.

In the silica base particle generation step, the temperature of the alkali catalyst solution (temperature at the time of supply) is, for example, preferably 5° C. or higher and 50° C. or lower, and more preferably 15° C. or higher and 45° C. or lower.

First Step

In the first step, a structure configured with a reaction product of a trifunctional silane coupling agent is formed.

Specifically, in the first step, for example, a trifunctional silane coupling agent is added to the silica base particle suspension, the trifunctional silane coupling agent is reacted on the surface of the silica base particles so that the structure configured with a reaction product of the trifunctional silane coupling agent is formed. The functional groups of the trifunctional silane coupling agent react with one another and with the OH groups on the surface of the silica particles. As a result, the structure configured with a reaction product of the trifunctional silane coupling agent is formed.

The reaction of the trifunctional silane coupling agent is carried out by adding the trifunctional silane coupling agent to the silica base particle suspension and then heating the suspension with stirring.

Specifically, for example, the suspension is heated to a temperature of 40° C. or higher and 70° C. or lower, a trifunctional silane coupling agent is added thereto, and then the mixture is stirred. The stirring is continued, for example, preferably for 10 minutes or more and 24 hours or less, more preferably for 60 minutes or more and 420 minutes or less, and even more preferably 80 minutes or more and 300 minutes or less.

Second Step

In the second step, a nitrogen element-containing compound is adsorbed onto at least some of the pores of the reaction product of a trifunctional silane coupling agent.

Specifically, in the second step, first, for example, a nitrogen element-containing compound is added to the silica base particle suspension, and the mixture is stirred, for example, in a temperature range of 20° C. or higher and 50° C. or lower. In this way, the nitrogen element-containing compound is adsorbed onto at least some of the pores of the reaction product of a trifunctional silane coupling agent.

In the second step, for example, an alcohol solution containing a nitrogen element-containing compound may be added to the silica particle suspension.

The alcohol may, for example, be of the same type as or different type from the alcohol contained in the silica base particle suspension. For example, it is preferable that the alcohols be of the same type.

In the alcohol solution containing the nitrogen element-containing compound, for example, the concentration of the nitrogen element-containing compound is preferably 0.05% by mass or more and 10% by mass or less, and more preferably 0.1% by mass or more and 6% by mass or less.

Third Step

In the third step, after the second step or during the second step, the silica base particles having a structure in which the nitrogen element-containing compound is adsorbed onto at least some of the pores of the reaction product of a trifunctional silane coupling agent are hydrophobized.

Specifically, in the third step, for example, a nitrogen element-containing compound is added to the silica base particle suspension in which the aforementioned structure is formed, and then a hydrophobing agent is added thereto.

The functional groups of the hydrophobing agent react with one another and with the OH groups of the silica base particles, thereby forming a hydrophobic layer.

The reaction of the hydrophobing agent is carried out by adding the trifunctional silane coupling agent to the silica base particle suspension and then heating the suspension with stirring.

Specifically, for example, the suspension is heated to a temperature of 40° C. or higher and 70° C. or lower, a hydrophobing agent is added thereto, and then the mixture is stirred. The stirring is continued, for example, preferably for 10 minutes or more and 24 hours or less, more preferably for 20 minutes or more and 120 minutes or less, and even more preferably 20 minutes or more and 90 minutes or less.

Drying Step

In the manufacturing method of the specific silica particles, a drying step of removing a solvent from the suspension may be performed after the second step or the third step. The drying step may be carried out during the second step or third step.

Examples of the drying include heat drying, spray drying, and supercritical drying.

Spray drying can be performed by a conventionally known method using a commercially available spray dryer (including a rotary disk type and a nozzle type). For example, spray drying is performed by spraying a spray liquid in a hot air stream at a rate of 0.2 L/hour or more and 1 L/hour or less. At this time, the temperature of hot air is set so that, for example, the inlet temperature is preferably in a range of 70° C. or higher and 400° C. or lower and the outlet temperature is preferably in a range of 40° C. or higher and 120° C. or lower. In a case where the inlet temperature is lower than 70° C., the solids contained in the dispersion are not fully dried. In a case where the inlet temperature is higher than 400° C., the particle shape is distorted during the spray drying. Furthermore, in a case where the outlet temperature is lower than 40° C., the degree of drying of the solids is poor, and the solids adhere to the inside of the device. The inlet temperature is, for example, more preferably in a range of 100° C. or higher and 300° C. or lower.

The silica particle concentration in the silica particle suspension during the spray drying is, for example, preferably in a range of 10% by mass or more and 30% by mass or less in terms of solids.

During the supercritical drying, solvents are removed with a supercritical fluid. Therefore, surface tension between particles is difficult to work, and the primary particles contained in the suspension are dried while being inhibited from causing aggregation. Therefore, it is easy to obtain the specific silica particles having a more uniform particle size.

Examples of the substance used as the supercritical fluid include carbon dioxide, water, methanol, ethanol, acetone, and the like. From the viewpoint of treatment efficiency and from the viewpoint of inhibiting the occurrence of coarse particles, it is preferable that the solvent removing step, for example, be a step of using supercritical carbon dioxide.

Specifically, the supercritical drying is performed by, for example, the following operation.

The suspension is put in an airtight reactor, and then liquefied carbon dioxide is introduced into the reactor. Thereafter, the airtight reactor is heated, and the internal pressure of the airtight reactor is raised using a high-pressure pump so that the carbon dioxide in the airtight reactor is in a supercritical state. Then, the liquefied carbon dioxide is caused to flow into the airtight reactor, and the supercritical carbon dioxide is discharged from the airtight reactor, so that the supercritical carbon dioxide circulates in the suspension in the airtight reactor. While the supercritical carbon dioxide is circulating in the suspension, the solvent dissolves in the supercritical carbon dioxide and is removed along with the supercritical carbon dioxide discharged from the airtight reactor.

The internal temperature and pressure of the airtight reactor are set so that the carbon dioxide is in a supercritical state. Because the critical point of carbon dioxide is 31.1° C./7.38 MPa, for example, the temperature is set to 40° C. or higher and 200° C. or lower, and the pressure is set to 10 MPa or higher and 30 MPa or lower.

The flow rate of the supercritical fluid in supercritical drying is, for example, preferably 80 mL/sec or more and 240 mL/sec or less.

It is preferable that the obtained silica particles, for example, be disintegrated or sieved as necessary so that coarse particles and aggregates are removed. The silica particles are disintegrated, for example, by a dry pulverizer such as a jet mill, a vibration mill, a ball mill, or a pin mill. The silica particles are sieved, for example, by a vibration sieve, a pneumatic sieving machine, or the like.

The amount (content) of the specific silica particles added to the exterior of the toner particles with respect to the amount of the toner particles is, for example, preferably 0.5% by mass or more and 2.0% by mass or less, and more preferably 0.8% by mass or more and 1.5% by mass or less.

Other External Additives

As external additives, other external additives different from the specific silica particles may also be used.

Examples of other external additives include inorganic particles and organic particles other than the specific silica particles.

Examples of other inorganic particles include particles of silica, alumina, titanium oxide, barium titanate, magnesium titanate, calcium titanate, strontium titanate, zinc oxide, chromium oxide, cerium oxide, magnesium oxide, zirconium oxide, silicon carbide, silicon nitride, and the like.

The surface of other inorganic particles may have undergone a hydrophobizing treatment. The hydrophobizing treatment is performed, for example, by immersing the inorganic particles in a hydrophobing agent. The hydrophobing agent is not particularly limited, and examples thereof include a silane-based coupling agent, silicone oil, a titanate-based coupling agent, an aluminum-based coupling agent, and the like. One kind of each of these agents may be used alone, or two or more kinds of these agents may be used in combination.

Usually, the amount of the hydrophobing agent is, for example, 1 part by mass or more and 10 parts by mass or less with respect to 100 parts by mass of other inorganic particles.

Examples of the organic particles include resin particles (resin particles such as polystyrene, polymethylmethacrylate (PMMA), and melamine resin) and the like.

The amount (content) of other external additives added to the exterior of the toner particles with respect to the amount of the toner particles is, for example, preferably 0.05% by mass or more and 5.0% by mass or less, and more preferably 0.5% by mass or more and 3.0% by mass or less.

Manufacturing Method of Toner

Next, the manufacturing method of the toner according to the present exemplary embodiment will be described.

The toner according to the present exemplary embodiment is obtained by manufacturing toner particles and then adding external additives to the exterior of the toner particles as necessary.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). The manufacturing method of the toner particles is not particularly limited to these manufacturing methods, and a well-known manufacturing method is adopted.

Among the above methods, for example, the aggregation and coalescence method is preferably used for obtaining toner particles.

Specifically, for example, in a case where the toner particles are manufactured by the aggregation and coalescence method, the toner particles are manufactured through a step of preparing a resin particle dispersion in which resin particles to be a binder resin are dispersed (a resin particle dispersion-preparing step), a step of allowing the resin particles (plus other particles as necessary) to be aggregated in the resin particle dispersion (having been mixed with another particle dispersion as necessary) so as to form aggregated particles (aggregated particle forming step), and a step of heating an aggregated particle dispersion in which the aggregated particles are dispersed so as to allow the aggregated particles to undergo fusion·coalescence and to form toner particles (fusion·coalescence step).

Hereinafter, each of the steps will be specifically described.

In the following section, a method for obtaining toner particles containing a colorant and a release agent will be described. The colorant and the release agent are used as necessary. It goes without saying that other additives different from the colorant and the release agent may also be used.

Resin Particle Dispersion-Preparing Step

First, for example, a colorant particle dispersion in which colorant particles are dispersed and a release agent particle dispersion in which release agent particles are dispersed are prepared together with the resin particle dispersion in which resin particles to be a binder resin are dispersed.

The resin particle dispersion is prepared, for example, by dispersing the resin particles in a dispersion medium by using a surfactant.

Examples of the dispersion medium used for the resin particle dispersion include an aqueous medium.

Examples of the aqueous medium include distilled water, water such as deionized water, alcohols, and the like. One kind of each of these media may be used alone, or two or more kinds of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, for example, an anionic surfactant and a cationic surfactant are particularly preferable. The nonionic surfactant may be used in combination with an anionic surfactant or a cationic surfactant.

One kind of surfactant may be used alone, or two or more kinds of surfactants may be used in combination.

As for the resin particle dispersion, examples of the method for dispersing resin particles in the dispersion medium include general dispersion methods such as a rotary shearing homogenizer, a ball mill having media, a sand mill, and a dyno mill. Depending on the type of resin particles, the resin particles may be dispersed in the resin particle dispersion by using, for example, a transitional phase inversion emulsification method.

The transitional phase inversion emulsification method is a method of dissolving a resin to be dispersed in a hydrophobic organic solvent in which the resin is soluble, adding a base to an organic continuous phase (O phase) for causing neutralization, and then adding an aqueous medium (W phase), so that the resin undergoes conversion (so-called phase transition) from W/O to O/W, turns into a discontinuous phase, and is dispersed in the aqueous medium in the form of particles.

The volume-average particle size of the resin particles dispersed in the resin particle dispersion is, for example, preferably 0.01 μm or more and 1 μm or less, more preferably 0.08 μm or more and 0.8 μm or less, and even more preferably 0.1 μm or more and 0.6 μm or less.

For determining the volume-average particle size of the resin particles, a particle size distribution is measured using a laser diffraction-type particle size distribution analyzer (for example, LA-700 manufactured by HORIBA, Ltd.), a volume-based cumulative distribution from small-sized particles is drawn for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles contained in the resin particle dispersion is, for example, preferably 5% by mass or more and 50% by mass or less, and more preferably 10% by mass or more and 40% by mass or less.

For example, a colorant particle dispersion and a release agent particle dispersion are prepared in the same manner as the resin particle dispersion. That is, the volume-average particle size of particles, the dispersion medium, the dispersion method, and the particle content in the resin particle dispersion are also applied to the colorant particles to be dispersed in the colorant particle dispersion and the release agent particles to be dispersed in the release agent particle dispersion.

Aggregated Particle Forming Step

Next, the resin particle dispersion is mixed with the colorant particle dispersion and the release agent particle dispersion.

Then, in the mixed dispersion, the resin particles, the colorant particles, and the release agent particles are heteroaggregated so that aggregated particles are formed which have a diameter close to the diameter of the target toner particles and include the resin particles, the colorant particles, and the release agent particles.

Specifically, for example, an aggregating agent is added to the mixed dispersion, the pH of the mixed dispersion is adjusted so that the dispersion is acidic (for example, pH of 2 or higher and 5 or lower), and a dispersion stabilizer is added thereto as necessary. Then, the dispersion is heated to the glass transition temperature of the resin particles (specifically, for example, to a temperature equal to or higher than the glass transition temperature of the resin particles—30° C. and equal to or lower than the glass transition temperature of the resin particles—10° C.) so that the particles dispersed in the mixed dispersion are aggregated, thereby forming aggregated particles.

In the aggregated particle forming step, for example, in a state where the mixed dispersion is being stirred with a rotary shearing homogenizer, an aggregating agent may be added thereto at room temperature (for example, 25° C.), the pH of the mixed dispersion may be adjusted so that the dispersion is acidic (for example, pH of 2 or higher and 5 or lower), a dispersion stabilizer may be added to the dispersion as necessary, and then the dispersion may be heated.

Examples of the aggregating agent include a surfactant having polarity opposite to the polarity of the surfactant used as a dispersant added to the mixed dispersion, an inorganic metal salt, and a metal complex having a valency of 2 or higher. Particularly, in a case where a metal complex is used as the aggregating agent, the amount of the surfactant used is reduced, and the charging characteristics are improved.

An additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA), and the like.

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Fusion·Coalescence Step

The aggregated particle dispersion in which the aggregated particles are dispersed is then heated to, for example, a temperature equal to or higher than the glass transition temperature of the resin particles (for example, a temperature higher than the glass transition temperature of the resin particles by 10° C. to 30° C.) so that the aggregated particles are fused and coalesce, thereby forming toner particles.

Toner particles are obtained through the above steps.

The toner particles may be manufactured through a step of obtaining an aggregated particle dispersion in which the aggregated particles are dispersed, then mixing the aggregated particle dispersion with a resin particle dispersion in which resin particles are dispersed so as to cause the resin particles to be aggregated and adhere to the surface of the aggregated particles and to form second aggregated particles, and a step of heating a second aggregated particle dispersion in which the second aggregated particles are dispersed so as to cause the second aggregated particles to be fused and coalesce and to form toner particles having a core/shell structure.

After the fusion·coalescence step, the toner particles formed in a solution undergo known washing step, solid-liquid separation step, and drying step, thereby obtaining dry toner particles.

As the washing step, in view of charging properties, displacement washing using deionized water may be thoroughly performed. The solid-liquid separation step is not particularly limited. However, in view of productivity, suction filtration, pressure filtration, or the like may be performed. Furthermore, the method of the drying step is not particularly limited. However, in view of productivity, freeze drying, flush drying, fluidized drying, vibratory fluidized drying, or the like may be performed.

Then, for example, by adding an external additive to the obtained dry toner particles and mixing together the external additive and the toner particles, the toner according to the present exemplary embodiment are manufactured. The mixing may be performed, for example, using a V blender, a Henschel mixer, a Lödige mixer, or the like. Furthermore, coarse particles of the toner may be removed as necessary by using a vibratory sieving machine, a pneumatic sieving machine, or the like.

Electrostatic Charge Image Developer

The electrostatic charge image developer according to the present exemplary embodiment contains at least the toner according to the present exemplary embodiment.

The electrostatic charge image developer according to the present exemplary embodiment may be a one-component developer which contains only the toner according to the present exemplary embodiment or a two-component developer which is obtained by mixing together the toner and a carrier.

The carrier is not particularly limited, and examples thereof include known carriers. Examples of the carrier include a coated carrier obtained by coating the surface of a core material consisting of magnetic powder with a coating resin; a magnetic powder dispersion-type carrier obtained by dispersing magnetic powder in a matrix resin and mixing the powder and the resin together; a resin impregnation-type carrier obtained by impregnating porous magnetic powder with a resin; and the like.

Each of the magnetic powder dispersion-type carrier and the resin impregnation-type carrier may be a carrier obtained by coating a core material, which is particles configuring the carrier, with a coating resin.

Examples of the magnetic powder include magnetic metals such as iron, nickel, and cobalt; magnetic oxides such as ferrite and magnetite; and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond, a product obtained by modifying the straight silicone resin, a fluororesin, polyester, polycarbonate, a phenol resin, an epoxy resin, and the like.

The coating resin and the matrix resin may contain other additives such as conductive particles.

Examples of the conductive particles include metals such as gold, silver, and copper, and particles such as carbon black, titanium oxide, zinc oxide, tin oxide, barium sulfate, aluminum borate, and potassium titanate.

The surface of the core material is coated with a coating resin, for example, by a coating method using a solution for forming a coating layer obtained by dissolving the coating resin and various additives, which are used as necessary, in an appropriate solvent, and the like. The solvent is not particularly limited, and may be selected in consideration of the type of the coating resin used, coating suitability, and the like.

Specifically, examples of the resin coating method include a dipping method of dipping the core material in the solution for forming a coating layer; a spray method of spraying the solution for forming a coating layer to the surface of the core material; a fluidized bed method of spraying the solution for forming a coating layer to the core material that is floating by an air flow; a kneader coater method of mixing the core material of the carrier with the solution for forming a coating layer in a kneader coater and removing solvents; and the like.

The mixing ratio (mass ratio) between the toner and the carrier, represented by toner:carrier, in the two-component developer is, for example, preferably 1:100 to 30:100, and more preferably 3:100 to 20:100.

Image Forming Apparatus/Image Forming Method

The image forming apparatus/image forming method according to the present exemplary embodiment will be described.

The image forming apparatus according to the present exemplary embodiment includes an image holder, a charging unit that charges the surface of the image holder, an electrostatic charge image forming unit that forms an electrostatic charge image on the charged surface of the image holder, a developing unit that contains an electrostatic charge image developer and develops the electrostatic charge image formed on the surface of the image holder as a toner image by using the electrostatic charge image developer, a transfer unit that transfers the toner image formed on the surface of the image holder to the surface of a recording medium, a cleaning unit that has a cleaning blade cleaning the surface of the image holder, and a fixing unit that fixes the toner image transferred to the surface of the recording medium. As the electrostatic charge image developer, the electrostatic charge image developer according to the present exemplary embodiment is used.

In the image forming apparatus according to the present exemplary embodiment, an image forming method (image forming method according to the present exemplary embodiment) is performed which has a charging step of charging the surface of the image holder, an electrostatic charge image forming step of forming an electrostatic charge image on the charged surface of the image holder, a developing step of developing the electrostatic charge image formed on the surface of the image holder as a toner image by using the electrostatic charge image developer according to the present exemplary embodiment, a transfer step of transferring the toner image formed on the surface of the image holder to the surface of a recording medium, a cleaning step of cleaning the surface of the image holder by using a cleaning blade, and a fixing step of fixing the toner image transferred to the surface of the recording medium.

As the image forming apparatus according to the present exemplary embodiment, known image forming apparatuses are used, such as a direct transfer-type apparatus that transfers a toner image formed on the surface of the image holder directly to a recording medium; an intermediate transfer-type apparatus that performs primary transfer by which the toner image formed on the surface of the image holder is transferred to the surface of an intermediate transfer member and secondary transfer by which the toner image transferred to the surface of the intermediate transfer member is transferred to the surface of a recording medium; and an apparatus including a charge neutralizing unit that neutralizes charge by irradiating the surface of the image holder with charge neutralizing light before charging after the transfer of the toner image.

In the case of the intermediate transfer-type apparatus, as the transfer unit, for example, a configuration is adopted which has an intermediate transfer member with surface on which the toner image will be transferred, a primary transfer unit that performs primary transfer to transfer the toner image formed on the surface of the image holder to the surface of the intermediate transfer member, and a secondary transfer unit that performs secondary transfer to transfer the toner image transferred to the surface of the intermediate transfer member to the surface of a recording medium.

In the image forming apparatus according to the present exemplary embodiment, for example, a portion including the developing unit may be a cartridge structure (process cartridge) to be attached to and detached from the image forming apparatus. As the process cartridge, for example, a process cartridge is used which includes a developing unit that contains the electrostatic charge image developer according to the present exemplary embodiment.

An example of the image forming apparatus according to the present exemplary embodiment will be shown below, but the present invention is not limited thereto. Hereinafter, among the parts shown in the drawing, main parts will be described, and others will not be described.

FIG. 1 is a view schematically showing the configuration of the image forming apparatus according to the present exemplary embodiment.

The image forming apparatus shown in FIG. 1 includes first to fourth image forming units 10Y, 10M, 10C, and 10K (image forming units) adopting an electrophotographic method that output images of colors, yellow (Y), magenta (M), cyan (C), and black (K), based on color-separated image data. These image forming units (hereinafter, simply called "units" in some cases) 10Y, 10M, 10C, and 10K are arranged in a row in the horizontal direction in a state of being spaced apart by a predetermined distance. The units 10Y, 10M, 10C, and 10K may be process cartridges that are attached to and detached from the image forming apparatus.

An intermediate transfer belt 20 as an intermediate transfer member passing through the units 10Y, 10M, 10C, and 10K extends above the units in the drawing. The intermediate transfer belt 20 is looped over a driving roll 22 and a support roll 24 which is in contact with the inner surface of the intermediate transfer belt 20, the rolls 22 and 24 being spaced apart in the horizontal direction in the drawing. The intermediate transfer belt 20 is designed to run in a direction toward the fourth unit 10K from the first unit 10Y. Force is applied to the support roll 24 in a direction away from the driving roll 22 by a spring or the like (not shown in the drawing). Tension is applied to the intermediate transfer belt 20 looped over the two rolls. An intermediate transfer member cleaning device 30 facing the driving roll 22 is provided on the surface of the intermediate transfer belt 20 on the image holder side.

Toners including toners of four colors, yellow, magenta, cyan, and black, stored in toner cartridges 8Y, 8M, 8C, and 8K are supplied to developing devices (developing units) 4Y, 4M, 4C, and 4K of units 10Y, 10M, 10C, and 10K, respectively.

The first to fourth units 10Y, 10M, 10C, and 10K have the same configuration. Therefore, in the present specification, as a representative, the first unit 10Y will be described which is placed on the upstream side of the running direction of the intermediate transfer belt and forms a yellow image. Reference numerals marked with magenta (M), cyan (C), and black (K) instead of yellow (Y) are assigned in the same portions as these in the first unit 10Y, so that the second to fourth units 10M, 10C, and 10K will not be described again.

The first unit 10Y has a photoreceptor 1Y that acts as an image holder. Around the photoreceptor 1Y, a charging roll 2Y (an example of charging unit) that charges the surface of the photoreceptor 1Y at a predetermined potential, an exposure device 3 (an example of electrostatic charge image forming unit) that exposes the charged surface to a laser beam 3Y based on color-separated image signals so as to form an electrostatic charge image, a developing device 4Y (an example of developing unit) that develops the electrostatic charge image by supplying a charged toner to the electrostatic charge image, a primary transfer roll 5Y (an example of primary transfer unit) that transfers the developed toner image onto the intermediate transfer belt 20, and a photoreceptor cleaning device 6Y (an example of cleaning unit) that has a cleaning blade 6Y-1 removing the toner on the surface of the photoreceptor 1Y after the primary transfer are arranged in this order.

The primary transfer roll 5*y* is disposed on the inner side of the intermediate transfer belt 20, at a position facing the photoreceptor 1Y. Furthermore, a bias power supply (not shown in the drawing) for applying a primary transfer bias is connected to each of primary transfer rolls 5Y, 5M, 5C, and 5K. Each bias power supply varies the transfer bias applied to each primary transfer roll under the control of a control unit not shown in the drawing.

Hereinafter, the operation that the first unit 10Y carries out to form a yellow image will be described.

First, prior to the operation, the surface of the photoreceptor 1Y is charged to a potential of −600 V to −800 V by the charging roll 2Y.

The photoreceptor 1Y is formed of a photosensitive layer laminated on a conductive (for example, volume resistivity at 20° C.: $1\times10^{-6}$ Ωcm or less) substrate. The photosensitive layer has properties in that although this layer usually has a high resistance (resistance of a general resin), in a case where it is irradiated with the laser beam 3Y, the specific resistance of the portion irradiated with the laser beam changes. Therefore, via an exposure device 3, the laser beam 3Y is output to the surface of the charged photoreceptor 1Y according to the image data for yellow transmitted from the control unit not shown in the drawing. The laser beam 3Y is radiated to the photosensitive layer on the surface of the photoreceptor 1Y. As a result, an electrostatic charge image of a yellow image pattern is formed on the surface of the photoreceptor 1Y.

The electrostatic charge image is an image formed on the surface of the photoreceptor 1Y by charging. It is a so-called negative latent image formed in a manner in which the charges with which the surface of the photoreceptor 1Y is charged flow due to the reduction in the specific resistance of the portion of the photosensitive layer irradiated with the laser beam 3Y, but the charges in a portion not being irradiated with the laser beam 3Y remain.

The electrostatic charge image formed on the photoreceptor 1Y is rotated to a predetermined development position as the photoreceptor 1Y runs. At the development position, the electrostatic charge image on the photoreceptor 1Y turns in to visible image (developed image) as a toner image by the developing device 4Y.

The developing device 4Y contains, for example, an electrostatic charge image developer that contains at least a yellow toner and a carrier. By being stirred in the developing device 4Y, the yellow toner undergoes triboelectrification, carries charges of the same polarity (negative charge) as the charges with which the surface of the photoreceptor 1Y is charged, and is held on a developer roll (an example of developer holder). Then, as the surface of the photoreceptor 1Y passes through the developing device 4Y, the yellow toner electrostatically adhere to the neutralized latent image portion on the surface of the photoreceptor 1Y, and the latent image is developed by the yellow toner. The photoreceptor 1Y on which the yellow toner image is formed keeps on running at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and electrostatic force heading for the primary transfer roll 5Y from the photoreceptor 1Y acts on the toner image. As a result, the toner image on the photoreceptor 1Y is transferred onto the intermediate transfer belt 20. The transfer bias applied at this time has a polarity (+) opposite to the polarity (−) of the toner. For example, in the first unit 10Y, the transfer bias is set to +10 μA under the control of the control unit (not shown in the drawing).

Meanwhile, the residual toner on the photoreceptor 1Y is removed by a photoreceptor cleaning device 6Y and collected.

Furthermore, the primary transfer bias applied to the primary transfer rolls 5M, 5C, and 5K following the second unit 10M is also controlled according to the first unit.

In this way, the intermediate transfer belt 20 to which the yellow toner image is transferred in the first unit 10Y is sequentially transported through the second to fourth units 10M, 10C, and 10K, and the toner images of each color are superposed and transferred in layers.

The intermediate transfer belt 20, to which the toner images of four colors are transferred in layers through the first to fourth units, reaches a secondary transfer portion configured with the intermediate transfer belt 20, the support roll 24 in contact with the inner surface of the intermediate transfer belt, and a secondary transfer roll 26 (an example of secondary transfer unit) disposed on the image holding surface side of the intermediate transfer belt 20. Meanwhile, via a supply mechanism, recording paper P (an example of recording medium) is supplied at a predetermined timing to the gap between the secondary transfer roll 26 and the intermediate transfer belt 20 that are in contact with each other. Furthermore, secondary transfer bias is applied to the support roll 24. The transfer bias applied at this time has the same polarity (−) as the polarity (−) of the toner. The electrostatic force heading for the recording paper P from the intermediate transfer belt 20 acts on the toner image, which makes the toner image on the intermediate transfer belt 20 transferred onto the recording paper P. The secondary transfer bias to be applied at this time is determined according to the resistance detected by a resistance detecting unit (not shown in the drawing) for detecting the resistance of the secondary transfer unit, and the voltage thereof is controlled.

Then, the toner image is transported into a pressure contact portion (nip portion) of a pair of fixing rolls in the fixing device 28 (an example of fixing unit) and fixed to the surface of the recording paper P, and a fixed image is formed.

Examples of the recording paper P to which the toner image is to be transferred include plain paper used in electrophotographic copy machines, printers, and the like. Examples of the recording medium also include an OHP sheet and the like, in addition to the recording paper P.

In order to further improve the smoothness of the image surface after fixing, for example, it is preferable that the surface of the recording paper P be also smooth. For instance, coated paper prepared by coating the surface of plain paper with a resin or the like, art paper for printing, and the like are used.

The recording paper P on which the color image has been fixed is transported to an output portion, and a series of color image forming operations is finished.

Process Cartridge/Toner Cartridge

The process cartridge according to the present exemplary embodiment will be described.

The process cartridge according to the present exemplary embodiment includes a developing unit which contains the electrostatic charge image developer according to the present exemplary embodiment and develops an electrostatic charge image formed on the surface of an image holder as a toner image by using the electrostatic charge image developer. The process cartridge is detachable from the image forming apparatus.

The process cartridge according to the present exemplary embodiment is not limited to the above configuration. The process cartridge may be configured with a developing device and, for example, at least one member selected from other units, such as an image holder, a charging unit, an electrostatic charge image forming unit, and a transfer unit, as necessary.

An example of the process cartridge according to the present exemplary embodiment will be shown below, but the present invention is not limited thereto. Hereinafter, among the parts shown in the drawing, main parts will be described, and others will not be described.

Figure 2:
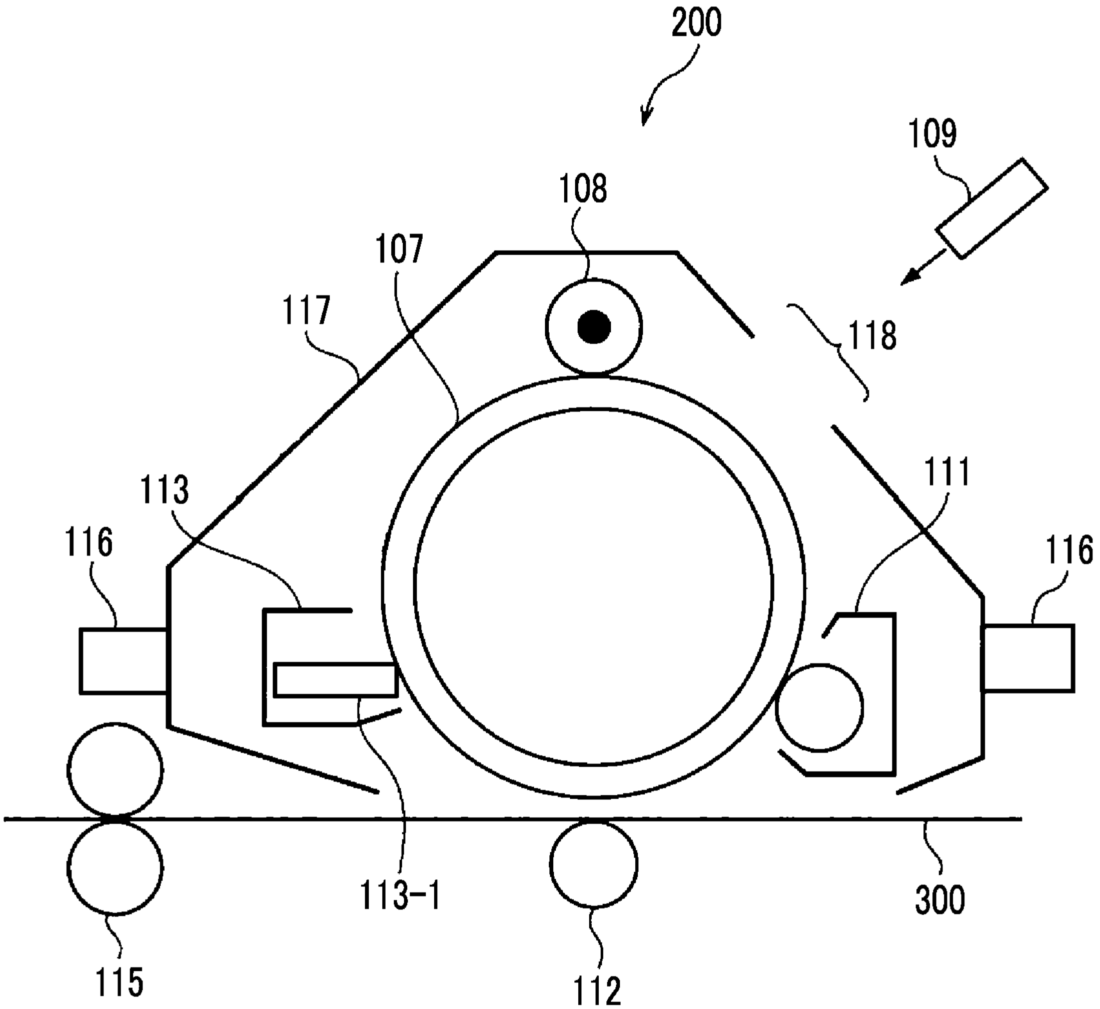
FIG. 2 is a view schematically showing the configuration of a process cartridge according to the present exemplary embodiment.

FIG. 2 is a view schematically showing the configuration of the process cartridge according to the present exemplary embodiment.

A process cartridge 200 shown in FIG. 2 is configured, for example, with a housing 117 that includes mounting rails 116 and an opening portion 118 for exposure, a photoreceptor 107 (an example of image holder), a charging roll 108 (an example of charging unit) that is provided on the periphery of the photoreceptor 107, a developing device 111 (an example of developing unit), a photoreceptor cleaning device 113 (an example of cleaning unit) that has a cleaning blade 113-1, which are integrally combined and held in the housing 117. The process cartridge 200 forms a cartridge in this way.

In FIG. 2, 109 represents an exposure device (an example of electrostatic charge image forming unit), 112 represents a transfer device (an example of transfer unit), 115 represents a fixing device (an example of fixing unit), and 300 represents recording paper (an example of recording medium).

Next, the toner cartridge according to the present exemplary embodiment will be described.

The toner cartridge according to the present exemplary embodiment is a toner cartridge including a container that contains the toner according to the present exemplary embodiment and is detachable from the image forming apparatus. The toner cartridge includes a container that contains a replenishing toner to be supplied to the developing unit provided in the image forming apparatus.

The image forming apparatus shown in FIG. 1 is an image forming apparatus having a configuration that enables toner cartridges 8Y, 8M, 8C, and 8K to be detachable from the apparatus. The developing devices 4Y, 4M, 4C, and 4K are connected to toner cartridges corresponding to the respective developing devices (colors) by a toner supply pipe not shown in the drawing. In a case where the amount of the toner contained in the toner cartridge is low, the toner cartridge is replaced.

EXAMPLES

Hereinafter, the present exemplary embodiments will be more specifically described with reference to examples and comparative examples. However, the present exemplary embodiments are not limited to the examples. In addition, unless otherwise specified, "part" and "%" are based on mass.

Preparation of Toner Particles

Toner Particles (1)

Synthesis of Amorphous Polyester Resin

- Bisphenol A ethylene oxide adduct [manufactured by FUJIFILM Wako Pure Chemical Corporation]: 150 parts
- Bisphenol A propylene oxide adduct [manufactured by FUJIFILM Wako Pure Chemical Corporation]: 250 parts
- Tetrapropenyl succinic anhydride [manufactured by FUJIFILM Wako Pure Chemical Corporation]: 130 copies
- Terephthalic acid [manufactured by FUJIFILM Wako Pure Chemical Corporation]: 100 parts
- Trimellitic acid [manufactured by FUJIFILM Wako Pure Chemical Corporation]: 15 parts The above monomer component are put into a reactor equipped with a stirrer, a thermometer, a condenser, and a nitrogen gas introduction tube, the reactor is cleaned out by dry nitrogen gas purging, and then tin dioctanoate at a proportion of 0.3% of the total amount of the above monomer components. 0.3% is added thereto. The temperature is raised to 235° C. for 1 hour under a nitrogen gas stream, a reaction is carried out for 3 hours, the internal pressure of the reactor is reduced to 10.0 mmHg, the reaction product is stirred, and the reaction is terminated at a point time when the molecular weight reaches an intended value.

The obtained amorphous polyester resin 1 had a glass transition temperature of 61° C., a weight-average molecular weight of 42,000, and an acid value of 13 mgKOH/g.

—Preparation of Amorphous Polyester Resin Dispersion—

- Amorphous polyester resin: 100 parts
- Methyl ethyl ketone: 60 parts
- Isopropyl alcohol: 10 parts The above components are put into a reactor equipped with a stirrer and dissolved at 60° C. After the components are found to be dissolved, the reactor is cooled to 35° C., and then 3.5 parts of a 10% aqueous ammonia solution is added thereto. Thereafter, 300 parts of deionized water is added dropped to the reactor for 3 hours, thereby preparing a polyester resin dispersion. Then, methyl ethyl ketone and isopropyl alcohol are removed by an evaporator, thereby obtaining an amorphous polyester resin dispersion.

Preparation of Colorant Particle Dispersion

- Cyan pigment [PigmentBlue 15: 3, manufactured Dainichiseika Color & Chemicals Mfg. Co., Ltd.] 10 parts
- Anionic surfactant [NEOGEN SC, manufactured by DKS Co. Ltd.] 2 parts
- Deionized water 80 parts The above components are mixed together and dispersed for 1 hour with a high-pressure impact disperser ULTIMIZER [HJP30006, manufactured by SUGINO MACHINE LIMITED], thereby obtaining a colorant particle dispersion having a volume-average particle size of 180 nm and a solid content of 20%.

Preparation of Mold Release Agent Particle Dispersion

- Paraffin wax [HNP 9, manufactured by NIPPON SEIRO CO., LTD.] 50 parts
- Anionic surfactant [NEOGEN SC, manufactured by DKS Co. Ltd.] 2 parts
- Deionized water 200 parts The above components are heated to 120° C., thoroughly mixed and dispersed together by ULTRA-TURRAX T50 manufactured by IKA, and then subjected to a dispersion treatment using a pressure discharge-type homogenizer, thereby obtaining a release agent particle dispersion having a volume-average particle size of 200 nm and a solid content of 20%.

Preparation of Toner Particles (1)

Amorphous polyester resin particle dispersion 210 parts
Aqueous colorant particle dispersion 25 parts
Release agent particle dispersion 30 parts
Polyaluminum chloride 0.4 parts
Deionized water 100 parts The above components are put into a stainless steel flask, thoroughly mixed and dispersed together by using ULTRA-TURRAX manufactured by IKA, and then heated to 48° C. in a state where the flask is being stirred in an oil bath. The flask is kept at 48° C. for 25 minutes, and then 70 parts of the same polyester resin dispersion as above is gently added thereto.

Thereafter, the pH in the system is adjusted to 8.0 by using an aqueous sodium hydroxide solution having a concentration of 0.5 mol/L, the stainless flask is then sealed, heated to 90° C. while being continuously stirred with a stirring shaft with a magnetic seal, and kept at 90° C. for 3 hours. After the reaction ends, the flask is cooled at a temperature drop rate of 2° C./min, the reaction mixture is subjected to filtration, then thoroughly washed with deionized water, and then subjected to solid-liquid separation by Nutsche suction filtration. The obtained substance is redispersed using 3 L of deionized water at 30° C., and the dispersion is stirred washed at 300 rpm for 15 minutes. This washing operation is repeated 6 more times, and at a point time when the pH of the filtrate reaches 7.54 and the electrical conductivity thereof reaches 6.5 μS/cm, solid-liquid separation is performed by Nutsche suction filtration by using No. 5A filter paper. Then, the filtrate is continuously dried for 12 hours dried in a vacuum, thereby obtaining toner particles (1).

The toner particles (1) have a volume-average particle size (D50v) of 6.1 μm and an average circularity of 0.965.

Preparation of External Additive

Preparation of Silica Particles

Silica particles 1, 3 to 36, and 39 to 44

Silica particles 1, 3 to 36 and 39 to 44 are prepared as below.

Preparation of Alkali Catalyst Solution

Methanol, deionized water, and aqueous ammonia ($NH_4OH$) in the amounts and concentrations shown in Table 1 are put into a glass reactor equipped with a metal stirring rod, a dropping nozzle, and a thermometer, and stirred and mixed together, thereby obtaining an alkali catalyst solution.

Granulation of Silica Base Particles by Sol-Gel Method

The temperature of the alkali catalyst solution is adjusted to 40° C., and the alkali catalyst solution is subjected to nitrogen purging. Then, while the alkali catalyst solution is being stirred, tetramethoxysilane (TMOS) in the amount shown in Table 1 and 124 parts by mass of aqueous ammonia ($NH_4OH$) having a catalyst ($NH_3$) concentration of 7.9% are simultaneously added dropwise to the solution, thereby obtaining a silica base particle suspension.

Addition of Trifunctional Silane Coupling Agent

While the silica base particle suspension is being heated at 40° C. and stirred, the trifunctional silane coupling agent of the type and amount shown in Table 1 is added to the suspension. Then, the solution is kept stirred for 120 minutes so that the trifunctional silane coupling agent reacts. In this way, an adsorptive structure is formed.

Addition of Nitrogen Element-Containing Compound

The nitrogen element-containing compound of the type shown in Table 1 is diluted with butanol, thereby preparing an alcohol solution.

Then, the alcohol solution obtained by diluting the nitrogen element-containing compound with butanol is added to the suspension. At this time, the alcohol solution is added so that the number of parts of the nitrogen element-containing compound is as shown in Table 1 with respect to 100 parts by mass of the solids of the silica base particle suspension. Thereafter, the mixture is stirred at 30° C. for 100 minutes, thereby obtaining a suspension containing a nitrogen element-containing compound.

Drying

Subsequently, 300 parts by mass of the suspension is put in a reaction vessel, $CO_2$ is added with stirring, and the internal temperature and pressure of the reaction vessel are raised to the temperature and pressure shown in Table 1. In a state where the suspension is being stirred at the temperature and pressure maintained, $CO_2$ is caused to flow in and out of the reaction vessel at a flow rate of 5 L/min. Then, the solvent is removed for 120 minutes, thereby obtaining silica particles 1, 3 to 36, and 39 to 44.

Silica Particles 12

Silica particles 12 are obtained in the same manner as silica particles 1, except that spray drying is performed using a mini spray dryer B-290 (manufactured by NIHON BUCHI K.K.) under the condition where the silica particle suspension is fed at a liquid feeding rate of 0.2 L/hour, by setting the internal temperature and pressure of the cylinder as shown in Table 1.

Silica Particles 37

Silica particles 37 are obtained in the same manner as silica particles 11, except that after the addition of the nitrogen element-containing compound, hexamethyldisilazane (HMDS) is added in an amount of 100% by mass with respect to the solids of the silica base particles, and the mixture is stirred at 65° C. for 3 hours so that the surface of the silica base particles is hydrophobized.

Silica Particles 38

Silica particles 38 are obtained in the same manner as silica particles 11, except that 30 g of dry silica AEROSIL 130 (manufactured by Nippon Aerosil Co., Ltd.) is dispersed as silica base particles in 300 g of methanol so that a silica base particle suspension is obtained.

Silica Particles C1, C2, and C3

Silica particles C1, C2, and C3 are obtained in the same manner as silica particles 1, except that the amounts of the trifunctional silane coupling agent and nitrogen element-containing compound added are set as shown in Table 1.

Examples 1 to 44 and Comparative Examples 1 to 3

The external additive (1.2 parts) shown in Table 2 is added to 100 parts of the toner particles (1), followed by mixing using a Henschel mixer at a circumferential speed of stirring of 30 m/sec for 15 minutes, thereby obtaining toners of examples.

Then, each of the obtained toners and carriers is put in a V blender at a ratio of toner:carrier=8:92 (mass ratio) and stirred for 20 minutes, thereby obtaining a developer.

The used carrier is prepared as below.

Ferrite particles (volume-average particle size: 36 μm) 100 parts
Toluene 14 parts
Styrene-methyl methacrylate copolymer 2 parts
(Component ratio: 90/10, Mw=80,000)

Carbon black (R330: manufactured by Cabot Corporation) 0.2 parts

First, the above components excluding the ferrite particles are stirred with a stirrer for 10 minutes, thereby preparing a dispersed coating liquid. Thereafter, the coating liquid and the ferrite particles are put in a vacuum deaerating kneader, stirred at 60° C. for 30 minutes, and then deaerated under reduced pressure while being heated, followed by drying, thereby obtaining a carrier.

Evaluation of Silica Particles

Various Characteristics of Silica Particles

The following characteristics of the obtained silica particles are measured according to the method described above.

number-average particle size (described as "particle size" in the table)

Average circularity (described as "circularity" in the table)

Number-based particle size distribution index (described as "particle size distribution" in the table)

Pore volume A of pores having a diameter of 1 nm or more and 50 nm or less determined from a pore size distribution curve obtained by a nitrogen adsorption method before baking at 350° C. (described as "Before baking at 350° C.·Pore volume A" in the table).

Pore volume B of pores having a diameter of 1 nm or more and 50 nm or less determined from a pore size distribution curve obtained by a nitrogen adsorption method after baking at 350° C. (described as "After baking at 350° C.·Pore volume B" in the table).

Volume resistivity Ra before baking at 350° C. (described as "Volume resistivity Ra before baking" in the table)

Volume resistivity Rb after baking at 350° C. (described as "Volume resistivity Rb after baking" in the table)

Amount of OH groups measured by the Sears method (described as "OH group amount" in the table)

Ratio of integral value C of signals observed in a range of chemical shift of −50 ppm or more and −75 ppm or less in a case where the integral value of all signals in Si-CP/MAS NMR spectrum is regarded as 100% (described as "Si-CP/MAS Area Ratio C" in the table).

Ratio C/D of C as an integral value of signals observed in a range of chemical shift of −50 ppm or more and −75 ppm or less in a Si-CP/MAS NMR spectrum to D as an integral value of signals observed in a range of chemical shift of −90 ppm or more and −120 ppm or less in the same spectrum (described as "Si-CP/MAS·Ratio C/D" in the table).

Degree of hydrophobicity

Charge Amount at Low Humidity, Charge Amount at High Humidity, and Charge Dependence of Capacitance For silica particles of each example, the charge amount at a low humidity and the charge amount at a high humidity are measured as follows, and the environmental dependence of capacitance is evaluated. Among the criteria, G1 and G2 are acceptable.

The evaluation method is as follows.

The prepared silica particles (2% by mass) are added to the surface of MA1010 manufactured by Nippon Shokubai Co., Ltd., and 5 g of the obtained resultant is mixed with 50 g of KNI106GSM manufactured by JFE Chemical Corporation. The obtained mixed sample is stirred for 5 minutes in a chamber at 10° C. and 10% RH with a tubular shaker, the charge is measured using TB200 manufactured by TOSHIBA CORPORATION, and the result is denoted by FC. Furthermore, the same sample is stirred for 5 minutes in a chamber at 30° C. and 90% RH with a tubular shaker, the charge is measured using TB200 manufactured by TOSHIBA CORPORATION, and the result is denoted by FA. The environmental dependence of capacitance is evaluated using a ratio of FA/FC.

A (⊙): FA/FC is 0.8 or more and less than 1.1.

B (○): FA/FC is 0.65 or more and less than 0.8.

C (Δ): FA/FC is 0.5 or more and less than 0.65.

D (x): FA/FC is less than 0.5.

Charge Distribution in Room-Temperature and Normal-Humidity Environment

The charge distribution of the silica particles of each example in a room-temperature and normal-humidity environment (environment at 20° C. and 50% RH) is evaluated as follows.

The prepared silica particles (2% by mass) are added to the surface of MA1010 manufactured by Nippon Shokubai Co., Ltd., and 5 g of the obtained resultant is mixed with 50 g of KNI106GSM manufactured by JFE Chemical Corporation. The obtained mixed sample is stirred for 100 minutes in a chamber at 20° C. and 50% RH with a tubular shaker, and the charge distribution is evaluated by image analysis of CSG (charge spectrography). The charge distribution is defined as a value obtained by dividing the difference between a charge amount Q(20) accounting for an integrated cumulative percentage of 20% in the charge distribution and a charge amount Q(80) accounting for an integrated cumulative percentage of 80% in the charge distribution by a charge amount Q(50) accounting for an integrated cumulative percentage of 50% in the charge distribution. That is, the charge distribution is defined as [Q(80)−Q(20)]/Q(50). The evaluation criteria are as follows.

A (⊙): The value of [Q(80)−Q(20)]/Q(50) is less than 0.7.

B (○): The value of [Q(80)−Q(20)]/Q(50) is less than 0.8 and 0.7 or more.

C (Δ): The value of [Q(80)−Q(20)]/Q(50) is less than 1.0 and 0.8 or more.

D (x): The value of [Q(80)−Q(20)]/Q(50) is 1.0 or more.

Narrow Charge Distribution Retentivity in Room-Temperature and Normal-Humidity Environment The narrow charge distribution retentivity of the silica particles of each example in a room-temperature and normal-humidity environment (environment at 20° C. and 50% RH) is evaluated as follows.

The prepared silica particles (2% by mass) are added to the surface of MA1010 manufactured by Nippon Shokubai Co., Ltd., and 5 g of the obtained resultant is mixed with 50 g of KNI106GSM manufactured by JFE Chemical Corporation. The obtained mixed sample is stirred for 100 minutes in a chamber at 20° C. and 50% RH with a tubular shaker, and the charge distribution is evaluated by image analysis of CSG (charge spectrography). The charge distribution is defined as a value obtained by dividing the difference between a charge amount Q(20) accounting for an integrated cumulative percentage of 20% in the charge distribution and a charge amount Q(80) accounting for an integrated cumulative percentage of 80% in the charge distribution by a charge amount Q(50) accounting for an integrated cumulative percentage of 50% in the charge distribution. That is, the charge distribution is defined as [Q(80)−Q(20)]/Q(50). The evaluation criteria are as follows.

A (⊙): The value of [Q(80)−Q(20)]/Q(50) is less than 0.75.

B (○): The value of [Q(80)−Q(20)]/Q(50) is less than 0.85 and 0.75 or more.

C (Δ): The value of [Q(80)−Q(20)]/Q(50) is less than 1.0 and 0.85 or more.

D (x): The value of [Q(80)−Q(20)]/Q(50) is 1.0 or more.

The evaluation results are shown in Table 1.

Details of the abbreviations in Table 1 are as follows.

MTMS: methyltrimethoxysilane

DIMS: n-dodecyltrimethoxysilane

TP415: $[N^+(CH)_3(C_{14}C_{29})_2]_4$ $Mo_8O_{28}{}^{4-}$ ("TP-415", manufactured by Hodogaya Chemical Co., Ltd., N,N-Dimethyl-N-tetradecyl-1-tetradecanaminium, hexa-μ-oxotetra-μ3-oxodi-μ5-oxotetradecaoxooctamolybdate (4-) (4:1))

Evaluation of Toner

Cloud in a High-Temperature and High-Humidity Environment (Toner Scattering)

The toner cartridge is filled with the toner of each example and attached to an image forming apparatus (a machine prepared by modifying ApeosPort-IV C5575 manufactured by FUJIFILM Business Innovation Corp.)

The developing device in the image forming apparatus is filled with the developer of each example. The apparatus is left to stand for 24 hours in an environment with a temperature of 30° C. and a relative humidity of 90%. After being left to stand, the apparatus is used for forming 100,000 images with an image density of 1% on A4 size paper at a printing rate of 1 sheet/120 sec.

After the formation of images, the surface of the upper cover of the developing machine is tape-transferred onto an OHP sheet by using a mending tape. The density of the tape-transferred mending tape is measured at 8 spots at equal intervals by using an image densitometer X-Rite 938 (manufactured by X-Rite Inc.), and a difference between the measured density and the density of only the mending tape is quantified as the amount of contamination caused by the toner in the machine. Based on the maximum density, the amount of contamination caused by the toner in the machine is classified as follows. Up to G3 is suited for practical use. The evaluation criteria are as follows.

—Evaluation Criteria—

G1 (⊙): 0≤Δ density≤0.2

G2 (○): 0.2<Δ density≤0.4

G3 (Δ): 0.4<Δ density≤0.6

G4 (x): 0.6<Δ density≤0.8

G5 (x): 0.8<Δ density

Fine Line Reproducibility in High-Temperature and High-Humidity Environment

The fine line reproducibility is evaluated as follows.

After the cloud (toner scattering) in a high-temperature and high-humidity environment is evaluated as above, 1on1off image (image consisting of 1-dot lines arranged in parallel at an interval of 1 dot) is output at a resolution of 2,400 dpi as a 5 cm×5 cm chart in a direction perpendicular to the development direction, on the upper left, center, and lower right sides of A4 paper. Each of the charts printed on the output sample is observed using a scale loupe at 100× magnification so as to check whether or not there is a site where the line spacing is narrowed due to the toner scattering or the like or whether or not there is a site where the line spacing widens due to the thinning of fine lines. The evaluation criteria are as follows.

—Evaluation Criteria—

G1 (⊙): Substantially no site is observed where the distance is reduced due to toner scattering or increases due to thinning of fine lines.

G2 (○): Although the distance is found to slightly decrease or increase, fine lines are checked.

G3 (Δ): The line spacing cannot be determined, or missing of fine lines is observed in at least one chart.

G4 (x): The line spacing cannot be determined, or missing of fine lines is observed in at least two charts.

G5 (x): The line spacing cannot be determined, or missing of fine lines is observed in three or more charts.

Fogging in Room-Temperature and Normal-Humidity Environment

Fogging is evaluated as follows.

After the fine line reproducibility in high-temperature and high-humidity environment is evaluated as above, the image forming apparatus is left to stand for 24 hours in an environment with a temperature of 20° C. and a relative humidity of 50%. After being left to stand, the apparatus is used for continuously forming 10 images with an image density of 40% on A4 size paper. The ten images are observed with the unaided eye and with a scale loupe at 5× magnification, and the state of fogging is classified as follows. The evaluation criteria are as follows.

—Evaluation Criteria—

G1 (⊙): No fogging is observed on all 10 sheets.

G2 (○): Slight fogging is observed in one sheet with the loupe, but is not a problem.

G3 (Δ): Slight fogging is observed in a plurality of sheets with the loupe, but the fogging is insignificant and is not problematic for practical use.

G4 (x): Fogging is observed in a plurality of sheets with the unaided eye, which is unsuitable for practical use.

G5 (x): Fogging is observed in all 10 sheets with the unaided eye, which is unsuitable for practical use.

TABLE 1-1

| | Granulation of silica base particles | | | | | | Trifunctional silane coupling agent | |
|---|---|---|---|---|---|---|---|---|
| | | Methanol | Aqueous ammonia | Concentration | Silane alkoxide | | | |
| | Granulation method | Mass [parts] | Mass [parts] | of ammonia % | Type | Mass [parts] | Type | Mass [parts] |
| 1 | Sol-gel method | 950 | 166 | 9.6 | TMOS | 1000 | MTMS | 50 |
| 2 | Sol-gel method | 950 | 166 | 9.6 | TMOS | 1000 | MTMS | 50 |
| 3 | Sol-gel method | 950 | 166 | 9.6 | TMOS | 1000 | MTMS | 22 |
| 4 | Sol-gel method | 950 | 166 | 9.6 | TMOS | 1000 | MTMS | 190 |
| 5 | Sol-gel method | 950 | 72 | 16.7 | TMOS | 1000 | MTMS | 195 |
| 6 | Sol-gel method | 950 | 96 | 16.7 | TMOS | 1000 | MTMS | 120 |
| 7 | Sol-gel method | 950 | 200 | 10.0 | TMOS | 1000 | MTMS | 25 |
| 8 | Sol-gel method | 950 | 232 | 5.2 | TMOS | 1000 | MTMS | 22 |
| 9 | Sol-gel method | 950 | 166 | 9.6 | TMOS | 1000 | MTMS | 22 |
| 10 | Sol-gel method | 950 | 166 | 9.6 | TMOS | 1000 | MTMS | 190 |
| 11 | Sol-gel method | 950 | 166 | 9.6 | TMOS | 1000 | MTMS | 22 |
| 12 | Sol-gel method | 950 | 166 | 9.6 | TMOS | 1000 | MTMS | 25 |
| 13 | Sol-gel method | 950 | 166 | 9.6 | TMOS | 1000 | MTMS | 130 |
| 14 | Sol-gel method | 950 | 166 | 9.6 | TMOS | 1000 | MTMS | 180 |

TABLE 1-1-continued

| | | | | | | | | |
|---|---|---|---|---|---|---|---|---|
| 15 | Sol-gel method | 950 | 166 | 9.6 | TMOS | 1000 | MTMS | 30 |
| 16 | Sol-gel method | 950 | 166 | 9.6 | TMOS | 1000 | MTMS | 50 |
| 17 | Sol-gel method | 950 | 166 | 9.6 | TMOS | 1000 | MTMS | 120 |
| 18 | Sol-gel method | 950 | 166 | 9.6 | TMOS | 1000 | MTMS | 180 |
| 19 | Sol-gel method | 950 | 110 | 9.1 | TMOS | 450 | MTMS | 100 |
| 20 | Sol-gel method | 950 | 220 | 9.1 | TMOS | 1000 | MTMS | 50 |
| 21 | Sol-gel method | 950 | 250 | 12.0 | TMOS | 1100 | MTMS | 50 |
| 22 | Sol-gel method | 900 | 55 | 9.1 | TMOS | 1000 | MTMS | 50 |
| 23 | Sol-gel method | 850 | 72 | 9.7 | TMOS | 1000 | MTMS | 50 |
| 24 | Sol-gel method | 950 | 177 | 9.6 | TMOS | 1000 | MTMS | 50 |
| 25 | Sol-gel method | 950 | 220 | 9.1 | TMOS | 1000 | MTMS | 50 |
| 26 | Sol-gel method | 950 | 166 | 9.6 | TMOS | 1000 | MTMS | 50 |
| 27 | Sol-gel method | 950 | 166 | 9.6 | TMOS | 1000 | MTMS | 50 |
| 28 | Sol-gel method | 950 | 166 | 9.6 | TMOS | 1000 | MTMS | 23 |
| 29 | Sol-gel method | 950 | 166 | 9.6 | TMOS | 1000 | MTMS | 30 |
| 30 | Sol-gel method | 950 | 166 | 9.6 | TMOS | 1000 | MTMS | 135 |
| 31 | Sol-gel method | 950 | 166 | 9.6 | TMOS | 1000 | MTMS | 142 |
| 32 | Sol-gel method | 950 | 166 | 9.6 | TMOS | 1000 | DTMS | 50 |
| 33 | Sol-gel method | 950 | 166 | 9.6 | TMOS | 1000 | MTMS | 50 |
| 34 | Sol-gel method | 950 | 166 | 9.6 | TMOS | 1000 | MTMS | 50 |
| 35 | Sol-gel method | 950 | 166 | 9.6 | TMOS | 1000 | MTMS | 50 |
| 36 | Sol-gel method | 950 | 166 | 9.6 | TMOS | 1000 | MTMS | 50 |
| 37 | Sol-gel method | 950 | 166 | 9.6 | TMOS | 1000 | MTMS | 50 |
| 38 | Dry method | — | | | — | — | MTMS | 50 |
| 39 | Sol-gel method | 950 | 166 | 9.6 | TMOS | 1000 | MTMS | 50 |
| 40 | Sol-gel method | 950 | 166 | 9.6 | TMOS | 1000 | MTMS | 50 |
| 41 | Sol-gel method | 950 | 166 | 9.6 | TMOS | 1000 | MTMS | 50 |
| 42 | Sol-gel method | 950 | 166 | 9.6 | TMOS | 1000 | MTMS | 50 |
| 43 | Sol-gel method | 950 | 166 | 9.6 | TMOS | 1000 | MTMS | 50 |
| 44 | Sol-gel method | 950 | 166 | 9.6 | TMOS | 1000 | MTMS | 50 |
| C1 | Sol-gel method | 950 | 166 | 9.6 | TMOS | 1000 | MTMS | 10 |
| C2 | Sol-gel method | 950 | 166 | 9.6 | TMOS | 1000 | MTMS | 260 |
| C3 | Sol-gel method | 950 | 166 | 9.6 | TMOS | 1000 | MTMS | 20 |

| | N-containing compound Type | Mass [parts] | Hydrophobizing agent Type | Hydrophobizing agent Mass [parts] | Drying step Drying method | Temperature ° C. | Pressure Mpa |
|---|---|---|---|---|---|---|---|
| 1 | TP415 | 5 | — | — | Supercritical Drying | 150 | 15 |
| 2 | TP415 | 2 | — | — | Spray drying | 100 | 0.1 |
| 3 | TP415 | 1 | — | — | Supercritical Drying | 150 | 15 |
| 4 | TP415 | 45 | — | — | Supercritical Drying | 150 | 15 |
| 5 | TP415 | 5 | — | — | Supercritical Drying | 150 | 15 |
| 6 | TP415 | 5 | — | — | Supercritical Drying | 150 | 15 |
| 7 | TP415 | 5 | — | — | Supercritical Drying | 150 | 15 |
| 8 | TP415 | 5 | — | — | Supercritical Drying | 150 | 15 |
| 9 | TP415 | 5 | — | — | Supercritical Drying | 150 | 15 |
| 10 | TP415 | 5 | — | — | Supercritical Drying | 150 | 15 |
| 11 | TP415 | 0.5 | — | — | Supercritical Drying | 150 | 15 |
| 12 | TP415 | 3 | — | — | Supercritical Drying | 150 | 15 |
| 13 | TP415 | 12 | — | — | Supercritical Drying | 150 | 15 |
| 14 | TP415 | 19 | — | — | Supercritical Drying | 150 | 15 |
| 15 | TP415 | 4 | — | — | Supercritical Drying | 150 | 15 |
| 16 | TP415 | 4 | — | — | Supercritical Drying | 150 | 15 |
| 17 | TP415 | 5 | — | — | Supercritical Drying | 150 | 15 |
| 18 | TP415 | 5 | — | — | Supercritical Drying | 150 | 15 |
| 19 | TP415 | 10 | — | — | Supercritical Drying | 150 | 15 |
| 20 | TP415 | 4 | — | — | Supercritical Drying | 150 | 15 |
| 21 | TP415 | 4 | — | — | Supercritical Drying | 150 | 15 |
| 22 | TP415 | 4 | — | — | Supercritical Drying | 150 | 15 |
| 23 | TP415 | 4 | — | — | Supercritical Drying | 150 | 15 |
| 24 | TP415 | 4 | — | — | Supercritical Drying | 150 | 15 |
| 25 | TP415 | 4 | — | — | Supercritical Drying | 150 | 15 |
| 26 | TP415 | 20 | — | — | Supercritical Drying | 150 | 15 |
| 27 | TP415 | 0.53 | — | — | Supercritical Drying | 150 | 15 |
| 28 | TP415 | 0.8 | — | — | Supercritical Drying | 150 | 15 |
| 29 | TP415 | 1.2 | — | — | Supercritical Drying | 150 | 15 |
| 30 | TP415 | 11 | — | — | Supercritical Drying | 150 | 15 |
| 31 | TP415 | 15 | — | — | Supercritical Drying | 150 | 15 |
| 32 | TP415 | 5 | — | — | Supercritical Drying | 150 | 15 |
| 33 | Dimethyl stearyl ammonium chloride | 5 | — | — | Supercritical Drying | 150 | 15 |
| 34 | Tributylamine | 5 | — | — | Supercritical Drying | 150 | 15 |
| 35 | Dimethyl octadecyl[3-(trimethoxysilyl)propyl] ammonium chloride | 5 | — | — | Supercritical Drying | 150 | 15 |
| 36 | Quotanium-80 | 5 | — | — | Supercritical Drying | 150 | 15 |
| 37 | TP415 | 5 | HMDS | 50 | Supercritical Drying | 150 | 15 |

TABLE 1-1-continued

| | | | | | | | |
|---|---|---|---|---|---|---|---|
| 38 | TP415 | 5 | — | — | Supercritical Drying | 150 | 15 |
| 39 | Di-tetrakis(dibutyl-benzylammonium)molybdate | 5 | — | — | Supercritical Drying | 150 | 15 |
| 40 | Phenethylamine | 5 | — | — | Supercritical Drying | 150 | 15 |
| 41 | 4-(2-Octylamino)diphenylamine | 5 | — | — | Supercritical Drying | 150 | 15 |
| 42 | N-benzyl-N-methylethanol amine | 5 | — | — | Supercritical Drying | 150 | 15 |
| 43 | 2,3-Bis(2,6-diisopropyl-phenylimino)butane | 5 | — | — | Supercritical Drying | 150 | 15 |
| 44 | 3-Indole acetonitrile | 5 | — | — | Supercritical Drying | 150 | 15 |
| C1 | TP415 | 0.1 | — | — | Supercritical Drying | 150 | 15 |
| C2 | TP415 | 50 | — | — | Supercritical Drying | 150 | 15 |
| C3 | n-Hexadecyl trimethyl ammonium bromide | 0.2 | — | — | Supercritical Drying | 150 | 15 |

TABLE 1-2

| | Particle characteristics | | | | | | | | | | | | |
|---|---|---|---|---|---|---|---|---|---|---|---|---|---|
| | Particle size nm | Circularity — | Particle size dis-tribution — | X % | Y/X — | Pore volume A before baking at 350° C. cm^3/g | Pore volume B after baking at 350° C. cm^3/g | B/A — | Volume resistivity Ra before baking Ω · cm | Volume resistivity Rb after baking Ω · cm | Ra/Rb — | Amount of OH group Number of OH groups/ nm^2 | hydro-phobicity % |
| 1 | 61 | 0.88 | 1.16 | 85 | 0.09 | 0.52 | 0.87 | 1.67 | 1..0 × $10^{10}$ | 1..0 × $10^{11.5}$ | 0.032 | 2.91 | 35 |
| 2 | 63 | 0.89 | 1.19 | 88 | 0.08 | 0.62 | 0.85 | 1.37 | 1..0 × $10^{9.5}$ | 1..0 × $10^{11.2}$ | 0.020 | 3.90 | 38 |
| 3 | 62 | 0.88 | 1.16 | 75 | 0.12 | 0.18 | 0.21 | 1.20 | 1..0 × $10^{11}$ | 1..0 × $10^{11.5}$ | 0.316 | 5.42 | 18 |
| 4 | 61 | 0.86 | 1.16 | 84 | 0.07 | 0.60 | 3.00 | 5.00 | 1..0 × $10^{10.9}$ | 1..0 × $10^{12.5}$ | 0.025 | 0.25 | 48 |
| 5 | 62 | 0.87 | 1.15 | 86 | 0.09 | 2.10 | 2.70 | 1.29 | 1..0 × $10^{11.1}$ | 1..0 × $10^{12.9}$ | 0.016 | 0.15 | 55 |
| 6 | 60 | 0.88 | 1.15 | 80 | 0.09 | 1.10 | 1.50 | 1.36 | 1..0 × $10^{10.1}$ | 1..0 × $10^{11.8}$ | 0.020 | 0.20 | 50 |
| 7 | 61 | 0.88 | 1.16 | 78 | 0.22 | 0.20 | 0.40 | 2.00 | 1..0 × $10^{8.2}$ | 1..0 × $10^{11.9}$ | 0.002 | 5.41 | 21 |
| 8 | 63 | 0.89 | 1.30 | 75 | 0.26 | 0.18 | 0.31 | 1.72 | 1..0 × $10^{7.5}$ | 1..0 × $10^{10.9}$ | 0.000 | 5.72 | 20 |
| 9 | 61 | 0.88 | 1.16 | 79 | 0.25 | 0.12 | 0.20 | 1.67 | 1..0 × $10^{8.1}$ | 1..0 × $10^{11.2}$ | 0.001 | 5.48 | 23 |
| 10 | 62 | 0.86 | 1.16 | 81 | 0.07 | 2.45 | 3.00 | 1.22 | 1..0 × $10^{11.2}$ | 1..0 × $10^{12.8}$ | 0.025 | 0.31 | 51 |
| 11 | 60 | 0.87 | 1.16 | 89 | 0.04 | 0.17 | 0.22 | 1.29 | 1..0 × $10^{10.1}$ | 1..0 × $10^{10.9}$ | 0.158 | 5.28 | 16 |
| 12 | 64 | 0.86 | 1.16 | 81 | 0.05 | 0.18 | 0.25 | 1.39 | 1..0 × $10^{10.6}$ | 1..0 × $10^{11.9}$ | 0.398 | 5.14 | 19 |
| 13 | 62 | 0.87 | 1.16 | 82 | 0.03 | 0.50 | 1.50 | 3.00 | 1..0 × $10^{10.8}$ | 1..0 × $10^{11.9}$ | 0.079 | 0.31 | 52 |
| 14 | 61 | 0.88 | 1.16 | 80 | 0.05 | 0.52 | 1.70 | 3.27 | 1..0 × $10^{11.2}$ | 1..0 × $10^{12.3}$ | 0.079 | 0.29 | 58 |
| 15 | 61 | 0.87 | 1.16 | 85 | 0.15 | 0.20 | 0.28 | 1.40 | 1..0 × $10^{9.5}$ | 1..0 × $10^{11.2}$ | 0.020 | 4.98 | 20 |
| 16 | 61 | 0.9 | 1.16 | 86 | 0.12 | 0.21 | 0.30 | 1.43 | 1..0 × $10^{10.2}$ | 1..0 × $10^{11.4}$ | 0.063 | 3.01 | 35 |
| 17 | 63 | 0.89 | 1.16 | 85 | 0.05 | 1.45 | 1.80 | 1.24 | 1..0 × $10^{10.8}$ | 1..0 × $10^{11.9}$ | 0.079 | 0.31 | 49 |
| 18 | 62 | 0.88 | 1.16 | 86 | 0.04 | 1.62 | 2.30 | 1.42 | 1..0 × $10^{11.0}$ | 1..0 × $10^{12.3}$ | 0.050 | 0.27 | 56 |
| 19 | 10 | 0.77 | 1.29 | 89 | 0.20 | 0.98 | 2.82 | 2.88 | 1..0 × $10^{10.8}$ | 1..0 × $10^{11.8}$ | 0.100 | 0.60 | 59 |
| 20 | 80 | 0.91 | 1.25 | 74 | 0.18 | 0.55 | 1.21 | 2.20 | 1..0 × $10^{10.8}$ | 1..0 × $10^{11.5}$ | 0.063 | 4.20 | 31 |
| 21 | 200 | 0.93 | 1.18 | 61 | 0.15 | 0.58 | 1.31 | 2.26 | 1..0 × $10^{10.1}$ | 1..0 × $10^{10.9}$ | 0.158 | 4.40 | 25 |
| 22 | 62 | 0.6 | 1.30 | 85 | 0.11 | 0.80 | 1.10 | 1.38 | 1..0 × $10^{11.0}$ | 1..0 × $10^{12.3}$ | 0.050 | 0.30 | 38 |
| 23 | 62 | 0.7 | 1.17 | 85 | 0.12 | 0.81 | 1.01 | 1.25 | 1..0 × $10^{11.1}$ | 1..0 × $10^{12.1}$ | 0.100 | 0.50 | 37 |
| 24 | 62 | 0.9 | 1.16 | 86 | 0.13 | 0.53 | 0.83 | 1.57 | 1..0 × $10^{10.8}$ | 1..0 × $10^{11.8}$ | 0.100 | 3.20 | 35 |
| 25 | 62 | 0.96 | 1.17 | 87 | 0.12 | 0.42 | 0.73 | 1.74 | 1..0 × $10^{10}$ | 1..0 × $10^{11.5}$ | 0.032 | 3.50 | 34 |
| 26 | 62 | 0.87 | 1.16 | 80 | 0.15 | 0.21 | 0.80 | 3.81 | 1..0 × $10^{7}$ | 1..0 × $10^{11.3}$ | 0.005 | 3.00 | 36 |
| 27 | 62 | 0.85 | 1.16 | 88 | 0.11 | 0.70 | 0.85 | 1.21 | 1..0 × $10^{11.5}$ | 1..0 × $10^{11.5}$ | 0.501 | 2.98 | 35 |
| 28 | 62 | 0.87 | 1.16 | 88 | 0.25 | 0.15 | 0.30 | 2.00 | 1..0 × $10^{10.95}$ | 1..0 × $10^{10.9}$ | 0.891 | 5.31 | 18 |
| 29 | 62 | 0.86 | 1.16 | 89 | 0.12 | 0.25 | 0.33 | 1.32 | 1..0 × $10^{11.0}$ | 1..0 × $10^{11.1}$ | 0.794 | 5.01 | 21 |
| 30 | 62 | 0.88 | 1.16 | 80 | 0.05 | 0.82 | 1.30 | 1.59 | 1..0 × $10^{10.1}$ | 1..0 × $10^{12.0}$ | 0.013 | 0.30 | 45 |
| 31 | 62 | 0.89 | 1.16 | 79 | 0.06 | 0.93 | 1.52 | 1.63 | 1..0 × $10^{10}$ | 1..0 × $10^{12.2}$ | 0.006 | 0.31 | 48 |
| 32 | 61 | 0.88 | 1.16 | 80 | 0.08 | 0.80 | 1.21 | 1.51 | 1..0 × $10^{10.9}$ | 1..0 × $10^{12.3}$ | 0.040 | 3.40 | 31 |
| 33 | 61 | 0.88 | 1.16 | 75 | 0.28 | 0.29 | 0.88 | 3.03 | 1..0 × $10^{10.1}$ | 1..0 × $10^{11.1}$ | 0.100 | 3.00 | 35 |
| 34 | 61 | 0.88 | 1.16 | 65 | 0.29 | 0.35 | 0.65 | 1.86 | 1..0 × $10^{10.3}$ | 1..0 × $10^{12.3}$ | 0.010 | 2.98 | 36 |
| 35 | 61 | 0.88 | 1.16 | 76 | 0.25 | 0.25 | 0.79 | 3.16 | 1..0 × $10^{11}$ | 1..0 × $10^{12.1}$ | 0.079 | 0.21 | 35 |
| 36 | 61 | 0.88 | 1.16 | 80 | 0.09 | 0.18 | 0.67 | 3.72 | 1..0 × $10^{11.1}$ | 1..0 × $10^{12.2}$ | 0.020 | 1.20 | 51 |
| 37 | 61 | 0.88 | 1.16 | 68 | 0.09 | 0.31 | 0.51 | 1.65 | 1..0 × $10^{11.5}$ | 1..0 × $10^{13}$ | 0.032 | 2.91 | 63 |
| 38 | 38 | 0.71 | 1.30 | 89 | 0.21 | 0.38 | 0.46 | 1.21 | 1..0 × $10^{11.4}$ | 1..0 × $10^{12.8}$ | 0.010 | 0.15 | 35 |
| 39 | 61 | 0.88 | 1.16 | 65 | 0.15 | 0.65 | 0.88 | 1.35 | 1..0 × $10^{10.1}$ | 1..0 × $10^{11.3}$ | 0.063 | 2.95 | 31 |
| 40 | 61 | 0.88 | 1.16 | 55 | 0.28 | 0.68 | 0.88 | 1.29 | 1..0 × $10^{10.4}$ | 1..0 × $10^{11.0}$ | 0.251 | 2.89 | 35 |
| 41 | 61 | 0.88 | 1.16 | 78 | 0.14 | 0.54 | 0.87 | 1.61 | 1..0 × $10^{10.8}$ | 1..0 × $10^{11.5}$ | 0.200 | 2.91 | 36 |
| 42 | 61 | 0.88 | 1.16 | 58 | 0.27 | 0.51 | 0.85 | 1.67 | 1..0 × $10^{10.1}$ | 1..0 × $10^{11.6}$ | 0.032 | 2.98 | 39 |
| 43 | 61 | 0.88 | 1.16 | 81 | 0.11 | 0.58 | 0.85 | 1.47 | 1..0 × $10^{10.2}$ | 1..0 × $10^{11.5}$ | 0.050 | 2.94 | 41 |
| 44 | 61 | 0.88 | 1.16 | 80 | 0.12 | 0.64 | 0.86 | 1.34 | 1..0 × $10^{10.8}$ | 1..0 × $10^{11.7}$ | 0.126 | 2.89 | 38 |
| C1 | 65 | 0.89 | 1.16 | 81 | 0.13 | 0.14 | 0.15 | 1.07 | 1..0 × $10^{11.0}$ | 1..0 × $10^{11.0}$ | 1.000 | 5.61 | 10 |
| C2 | 62 | 0.91 | 1.16 | 71 | 0.21 | 0.25 | 3.24 | 12.96 | 1..0 × $10^{11.0}$ | 1..0 × $10^{13.1}$ | 0.008 | 0.18 | 59 |
| C3 | 61 | 0.88 | 1.16 | 18 | 5.28 | 0.18 | 0.20 | 1.11 | 1..0 × $10^{8.2}$ | 1..0 × $10^{11.3}$ | 0.001 | 2.91 | 18 |

TABLE 1-3

| | Proportion of area C in Si-CP/MAS % | Ratio C/D in Si-CP/MAS — | N-containing compound Content (in terms of N element) | Evaluation: Charge amount FA at high humidity μC | Charge amount FC at low humidity μC | Environmental dependence of capacitance — | Charge distribution at room temperature and normal humidity — | Narrow charge distribution retentivity at room temperature and normal humidity — |
|---|---|---|---|---|---|---|---|---|
| 1 | 7.6 | 0.156 | 0.040 | 25.5 | 30.2 | A (⊙) | A (⊙) | A (⊙) |
| 2 | 7.5 | 0.154 | 0.014 | 22.5 | 27.8 | A (⊙) | A (⊙) | A (⊙) |
| 3 | 5.5 | 0.101 | 0.009 | 23.5 | 35.0 | B (○) | B (○) | B (○) |
| 4 | 45.0 | 0.718 | 0.371 | 31.0 | 32.3 | A (⊙) | A (⊙) | B (○) |
| 5 | 46.0 | 0.742 | 0.040 | 30.1 | 33.8 | A (⊙) | B (○) | A (⊙) |
| 6 | 27.0 | 0.471 | 0.039 | 28.1 | 30.5 | A (⊙) | B (○) | A (⊙) |
| 7 | 3.9 | 0.121 | 0.041 | 23.1 | 25.6 | A (⊙) | B (○) | A (⊙) |
| 8 | 5.1 | 0.102 | 0.042 | 21.0 | 23.8 | A (⊙) | B (○) | A (⊙) |
| 9 | 4.9 | 0.105 | 0.042 | 23.0 | 25.8 | A (⊙) | B (○) | A (⊙) |
| 10 | 45.1 | 0.721 | 0.039 | 32.3 | 36.8 | A (⊙) | B (○) | A (⊙) |
| 11 | 5.1 | 0.103 | 0.005 | 20.5 | 30.8 | B (○) | B (○) | A (⊙) |
| 12 | 5.1 | 0.125 | 0.024 | 22.1 | 32.1 | B (○) | B (○) | B (○) |
| 13 | 29.8 | 0.492 | 0.101 | 29.8 | 33.5 | A (⊙) | A (⊙) | A (⊙) |
| 14 | 4.2 | 0.298 | 0.155 | 30.1 | 36.8 | A (⊙) | A (⊙) | A (⊙) |
| 15 | 5.0 | 0.135 | 0.033 | 22.1 | 28.1 | B (○) | B (○) | A (⊙) |
| 16 | 9.6 | 0.157 | 0.033 | 25.8 | 31.2 | A (⊙) | B (○) | A (⊙) |
| 17 | 27.5 | 0.480 | 0.040 | 25.6 | 32.1 | A (⊙) | A (⊙) | A (⊙) |
| 18 | 42.1 | 0.661 | 0.040 | 28.1 | 36.1 | B (○) | A (⊙) | A (⊙) |
| 19 | 53.1 | 0.749 | 0.083 | 32.5 | 35.1 | A (⊙) | A (⊙) | A (⊙) |
| 20 | 9.6 | 0.153 | 0.030 | 25.2 | 31.5 | A (⊙) | A (⊙) | A (⊙) |
| 21 | 8.5 | 0.148 | 0.030 | 22.3 | 29.1 | B (○) | B (○) | A (⊙) |
| 22 | 9.7 | 0.155 | 0.032 | 28.1 | 37.8 | B (○) | A (⊙) | A (⊙) |
| 23 | 9.4 | 0.156 | 0.031 | 28.5 | 37.2 | B (○) | B (○) | A (⊙) |
| 24 | 9.5 | 0.154 | 0.032 | 25.4 | 32.1 | B (○) | A (⊙) | A (⊙) |
| 25 | 9.3 | 0.157 | 0.031 | 23.0 | 28.9 | B (○) | B (○) | A (⊙) |
| 26 | 9.1 | 0.149 | 0.168 | 24.5 | 26.1 | A (⊙) | A (⊙) | A (⊙) |
| 27 | 9.5 | 0.155 | 0.005 | 28.5 | 37.1 | B (○) | B (○) | A (⊙) |
| 28 | 5.1 | 0.109 | 0.008 | 25.1 | 36.9 | B (○) | B (○) | B (○) |
| 29 | 5.2 | 0.128 | 0.012 | 26.8 | 37.1 | B (○) | B (○) | B (○) |
| 30 | 31.0 | 0.510 | 0.092 | 26.5 | 30.5 | A (⊙) | A (⊙) | A (⊙) |
| 31 | 33.5 | 0.531 | 0.131 | 28.1 | 30.1 | A (⊙) | A (⊙) | A (⊙) |
| 32 | 9.8 | 0.158 | 0.042 | 31.2 | 38.1 | A (⊙) | A (⊙) | A (⊙) |
| 33 | 9.1 | 0.154 | 0.210 | 24.8 | 30.5 | A (⊙) | B (○) | B (○) |
| 34 | 9.3 | 0.157 | 0.370 | 28.1 | 31.2 | A (⊙) | B (○) | B (○) |
| 35 | 8.5 | 0.510 | 0.140 | 29.9 | 35.5 | A (⊙) | B (○) | B (○) |
| 36 | 9.1 | 0.150 | 0.118 | 30.1 | 35.2 | A (⊙) | B (○) | B (○) |
| 37 | 8.9 | 0.156 | 0.040 | 25.5 | 30.2 | A (⊙) | A (⊙) | A (⊙) |
| 38 | 5.9 | 0.142 | 0.030 | 32.1 | 41.2 | B (○) | B (○) | A (⊙) |
| 39 | 8.0 | 0.153 | 0.091 | 25.1 | 37.2 | B (○) | A (⊙) | A (⊙) |
| 40 | 8.9 | 0.156 | 0.449 | 22.5 | 36.5 | B (○) | B (○) | B (○) |
| 41 | 9.5 | 0.155 | 0.212 | 25.4 | 36.9 | B (○) | B (○) | B (○) |
| 42 | 9.4 | 0.156 | 0.400 | 25.3 | 37.8 | B (○) | B (○) | B (○) |
| 43 | 9.5 | 0.157 | 0.168 | 25.9 | 38.1 | B (○) | B (○) | B (○) |
| 44 | 9.9 | 0.159 | 0.412 | 25.5 | 36.9 | B (○) | B (○) | B (○) |
| C1 | 2.6 | 0.040 | 0.001 | 22.1 | 41.5 | D (X) | D (X) | D (X) |
| C2 | 65.0 | 0.922 | 0.251 | 20.5 | 23 | A (⊙) | C (Δ) | D (X) |
| C3 | 4.2 | 0.120 | 0.007 | 18.9 | 28.3 | B (○) | D (X) | D (X) |

TABLE 2

| | Silica particles | Evaluation: Cloud at high temperature and high humidity | Fine line reproducibility at high temperature and high humidity | Fogging at room temperature and normal humidity |
|---|---|---|---|---|
| Example 1 | 1 | G1 (⊙) | G1 (⊙) | G1 (⊙) |
| Example 2 | 2 | G1 (⊙) | G1 (⊙) | G1 (⊙) |
| Example 3 | 3 | G1 (⊙) | G2 (○) | G2 (○) |
| Example 4 | 4 | G2 (○) | G2 (○) | G2 (○) |
| Example 5 | 5 | G1 (⊙) | G2 (○) | G2 (○) |
| Example 6 | 6 | G1 (⊙) | G2 (○) | G2 (○) |
| Example 7 | 7 | G1 (⊙) | G2 (○) | G2 (○) |
| Example 8 | 8 | G1 (⊙) | G2 (○) | G2 (○) |
| Example 9 | 9 | G1 (⊙) | G2 (○) | G2 (○) |
| Example 10 | 10 | G1 (⊙) | G2 (○) | G2 (○) |
| Example 11 | 11 | G1 (⊙) | G2 (○) | G2 (○) |
| Example 12 | 12 | G2 (○) | G2 (○) | G2 (○) |
| Example 13 | 13 | G1 (⊙) | G1 (⊙) | G1 (⊙) |
| Example 14 | 14 | G1 (⊙) | G2 (○) | G2 (○) |
| Example 15 | 15 | G1 (⊙) | G2 (○) | G1 (⊙) |
| Example 16 | 16 | G1 (⊙) | G2 (○) | G1 (⊙) |

TABLE 2-continued

| | | Evaluation | | |
|---|---|---|---|---|
| | Silica particles | Cloud at high temperature and high humidity | Fine line reproducibility at high temperature and high humidity | Fogging at room temperature and normal humidity |
| Example 17 | 17 | G1 (⊙) | G2 (○) | G1 (⊙) |
| Example 18 | 18 | G1 (⊙) | G2 (○) | G1 (⊙) |
| Example 19 | 19 | G1 (⊙) | G2 (○) | G2 (○) |
| Example 20 | 20 | G1 (⊙) | G2 (○) | G1 (⊙) |
| Example 21 | 21 | G1 (⊙) | G2 (○) | G1 (⊙) |
| Example 22 | 22 | G1 (⊙) | G2 (○) | G1 (⊙) |
| Example 23 | 23 | G1 (⊙) | G2 (○) | G2 (○) |
| Example 24 | 24 | G1 (⊙) | G2 (○) | G2 (○) |
| Example 25 | 25 | G1 (⊙) | G2 (○) | G2 (○) |
| Example 26 | 26 | G1 (⊙) | G2 (○) | G1 (⊙) |
| Example 27 | 27 | G1 (⊙) | G2 (○) | G2 (○) |
| Example 28 | 28 | G2 (○) | G2 (○) | G2 (○) |
| Example 29 | 29 | G2 (○) | G2 (○) | G2 (○) |
| Example 30 | 30 | G1 (⊙) | G2 (○) | G2 (○) |
| Example 31 | 31 | G1 (⊙) | G2 (○) | G2 (○) |
| Example 32 | 32 | G1 (⊙) | G2 (○) | G1 (⊙) |
| Example 33 | 33 | G2 (○) | G2 (○) | G2 (○) |
| Example 34 | 34 | G2 (○) | G2 (○) | G2 (○) |
| Example 35 | 35 | G1 (⊙) | G2 (○) | G1 (⊙) |
| Example 36 | 36 | G2 (○) | G2 (○) | G2 (○) |
| Example 37 | 37 | G2 (○) | G2 (○) | G2 (○) |
| Example 38 | 38 | G2 (○) | G3 (Δ) | G3 (Δ) |
| Example 39 | 39 | G2 (○) | G2 (○) | G2 (○) |
| Example 40 | 40 | G2 (○) | G2 (○) | G2 (○) |
| Example 41 | 41 | G2 (○) | G2 (○) | G2 (○) |
| Example 42 | 42 | G2 (○) | G2 (○) | G2 (○) |
| Example 43 | 43 | G2 (○) | G2 (○) | G2 (○) |
| Example 44 | 44 | G2 (○) | G2 (○) | G2 (○) |
| Comparative Example 1 | C1 | G5 (X) | G4 (X) | G5 (X) |
| Comparative Example 2 | C2 | G4 (X) | G4 (X) | G4 (X) |
| Comparative Example 3 | C3 | G5 (X) | G5 (X) | G5 (X) |

From the above results, it has been confirmed that the occurrence fogging in a room-temperature and normal-humidity environment is further suppressed in the present examples than in comparative examples. Particularly, it has been confirmed that even though images are repeatedly formed in a high-temperature and high-humidity environment, fogging is suppressed, the suppression of fogging is maintained.

Furthermore, it has been confirmed that the occurrence of cloud and the deterioration of fine line reproducibility are also suppressed in the present examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developing toner comprising:

toner particles; and silica particles that are added to an exterior of the toner particles, contain a nitrogen element-containing compound, have a ratio C/D of 0.10 or more and 0.75 or less where C represents an integral value of signals observed in a range of chemical shift of −50 ppm or more and −75 ppm or less in a $^{29}Si$ solid-state nuclear magnetic resonance spectrum obtained by a cross-polarization/magic angle spinning method and D represents an integral value of signals observed in a range of chemical shift of −90 ppm or more and −120 ppm or less in the same spectrum, have an extraction amount X of the nitrogen element-containing compound by a mixed solution of ammonia/methanol of 0.1% by mass or more, and satisfy Expression: $Y/X<0.3$ where X represents an extraction amount of the nitrogen element-containing compound by a mixed solution of ammonia/methanol and Y represents an extraction amount of the nitrogen element-containing compound by water, wherein the silica particles have silica base particles and a structure that covers at least a part of a surface of the silica base particles and is configured with a reaction product of a trifunctional silane coupling agent, and in which the nitrogen element-containing compound is adsorbed onto some of pores of the reaction product of the trifunctional silane coupling agent.

2. The electrostatic charge image developing toner according to claim 1, wherein a number-average particle size of the silica particles is 10 nm or more and 200 nm or less.

3. The electrostatic charge image developing toner according to claim 2, wherein the number-average particle size of the silica particles is 10 nm or more and 80 nm or less.

4. The electrostatic charge image developing toner according to claim 1, wherein an average circularity of the silica particles is 0.60 or more and 0.96 or less.

5. The electrostatic charge image developing toner according to claim 4, wherein the average circularity of the silica particles is 0.70 or more and 0.92 or less.

6. The electrostatic charge image developing toner according to claim 1, wherein a volume resistivity of the silica particles is $1.0\times10^{7}$ Ωcm or more and $1.0\times10^{11.5}$ Ωcm or less.

7. The electrostatic charge image developing toner according to claim 6, wherein in a case where Ra represents a volume resistivity of the silica particles before baking at 350° C. and Rb represents a volume resistivity of the silica particles after baking at 350° C., Ra/Rb is 0.01 or more and 0.8 or less.

8. The electrostatic charge image developing toner according to claim 1, wherein in a case where A represents a pore volume of pores of the silica particles having a diameter of 1 nm or more and 50 nm or less determined from a pore size distribution curve obtained by a nitrogen adsorption method before baking at 350° C., and B represents a pore volume of pores of the silica particles having a diameter of 1 nm or more and 50 nm or less determined from a pore size distribution curve obtained by a nitrogen adsorption method after baking at 350° C., B/A is 1.2 or more and 5 or less, and B is 0.2 $cm^3/g$ or more and 3 $cm^3/g$ or less.

9. The electrostatic charge image developing toner according to claim 1, wherein the nitrogen element-containing compound in the silica particles is at least one compound selected from the group consisting of a quaternary ammonium salt, a primary amine compound, a secondary amine compound, a tertiary amine compound, an amide compound, an imine compound, and a nitrile compound.

10. An electrostatic charge image developer comprising:

the electrostatic charge image developing toner according to claim 1.

11. A toner cartridge comprising:

a container that contains the electrostatic charge image developing toner according to claim 1, wherein the toner cartridge is detachable from an image forming apparatus.

12. A process cartridge comprising:

a container that contains the electrostatic charge image developer according to claim 10; and a developing unit that develops an electrostatic charge image formed on a surface of an image holder as a toner image by using the electrostatic charge image developer, wherein the process cartridge is detachable from an image forming apparatus.

13. An image forming apparatus, comprising:

an image holder;

a charging unit that charges a surface of the image holder;

an electrostatic charge image forming unit that forms an electrostatic charge image on the charged surface of the image holder;

a developing unit that contains the electrostatic charge image developer according to claim 11 and develops the electrostatic charge image formed on the surface of the image holder as a toner image by using the electrostatic charge image developer;

a transfer unit that transfers the toner image formed on the surface of the image holder to a surface of a recording medium;

a cleaning unit that has a cleaning blade cleaning the surface of the image holder; and a fixing unit that fixes the toner image transferred to the surface of the recording medium.

14. An image forming method, comprising:

charging a surface of an image holder;

forming an electrostatic charge image on the charged surface of the image holder;

developing the electrostatic charge image formed on the surface of the image holder as a toner image by using the electrostatic charge image developer according to claim 10;

transferring the toner image formed on the surface of the image holder to a surface of a recording medium;

cleaning the surface of the image holder with a cleaning blade; and fixing the toner image transferred to the surface of the recording medium.

15. The electrostatic charge image developing toner according to claim 1, wherein the nitrogen element-containing compound is a quaternary ammonium salt, represented by General Formula (AM):

General Formula (AM)

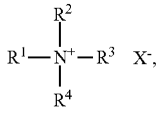

wherein $R^1$, $R^2$, $R^3$, and $R^4$ each independently represent a hydrogen atom or an alkyl, aralkyl, or aryl group which may have a substituent, and X− represents an anion.

* * * * *